(12) United States Patent
Doke et al.

(10) Patent No.: US 12,394,194 B1
(45) Date of Patent: Aug. 19, 2025

(54) CONSERVING POWER IN ITEM-IDENTIFYING CARTS

(71) Applicant: Amazon Technologies, Inc., Seattle, WA (US)

(72) Inventors: Abhay Doke, Boston, MA (US); Mohsen Malmir, Cambridge, MA (US); Ejaz Ahmed, Needham, MA (US); Kilho Son, Brookline, MA (US); Austen Groener, Bolton, MA (US); Vinod Krishnan Kulathumani, Westborough, MA (US)

(73) Assignee: Amazon Technologies, Inc., Seattle, WA (US)

( * ) Notice: Subject to any disclaimer, the term of this patent is extended or adjusted under 35 U.S.C. 154(b) by 547 days.

(21) Appl. No.: 17/853,381

(22) Filed: Jun. 29, 2022

(51) Int. Cl.
| | |
|---|---|
| *G06V 10/70* | (2022.01) |
| *G06V 10/774* | (2022.01) |
| *G06V 10/776* | (2022.01) |
| *G06V 20/50* | (2022.01) |
| *G06V 40/10* | (2022.01) |
| *H04N 7/18* | (2006.01) |
| *G06Q 20/20* | (2012.01) |

(52) U.S. Cl.
CPC ........... *G06V 10/87* (2022.01); *G06V 10/774* (2022.01); *G06V 10/776* (2022.01); *G06V 20/50* (2022.01); *G06V 40/10* (2022.01); *H04N 7/188* (2013.01); *G06Q 20/208* (2013.01)

(58) Field of Classification Search
CPC .... G06V 10/87; G06V 10/774; G06V 10/776; G06V 20/50; G06V 40/10; H04N 7/188; G06Q 20/208
See application file for complete search history.

(56) References Cited

U.S. PATENT DOCUMENTS

| | | | |
|---|---|---|---|
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 10,127,438 B1 | 11/2018 | Fisher et al. | |
| 10,133,933 B1 | 11/2018 | Fisher et al. | |
| 10,282,852 B1 * | 5/2019 | Buibas | ..................... G06T 7/246 |
| 11,182,632 B1 * | 11/2021 | Johnson | ................. H04N 23/90 |
| 11,208,134 B2 * | 12/2021 | Carter | ................... B62B 5/0423 |
| 2013/0284806 A1 | 10/2013 | Margalit | |
| 2021/0209643 A1 * | 7/2021 | Manoharan | ........ G06Q 30/0269 |
| 2022/0262069 A1 * | 8/2022 | Singh | ..................... G06T 17/10 |
| 2024/0320622 A1 * | 9/2024 | Fisher | .................... G06N 3/045 |

\* cited by examiner

*Primary Examiner* — Andrew M Moyer
*Assistant Examiner* — Ahmed A Nasher
(74) *Attorney, Agent, or Firm* — Kilpatrick Townsend & Stockton LLP

(57) ABSTRACT

This disclosure is directed to an item-identifying, mobile cart that may be utilized by a user in a materials handling facility to automatically identify items that the user places into a basket of the cart. The cart may include cameras for detecting activity near a basket of the cart, such as a user placing an item into the basket. The cart or a computing device communicatively coupled to the cart may use a trained machine-learning model to identify the activity, and may improve the accuracy of the model over time using real-world data of users operating carts in respective facilities.

18 Claims, 19 Drawing Sheets

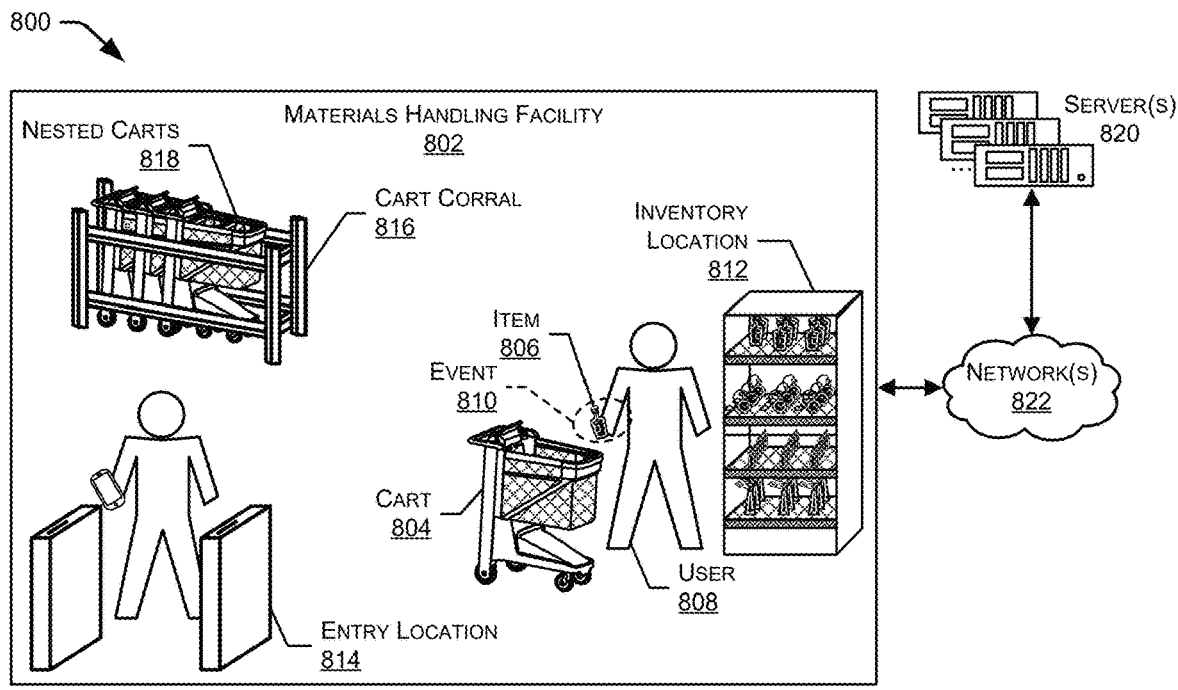
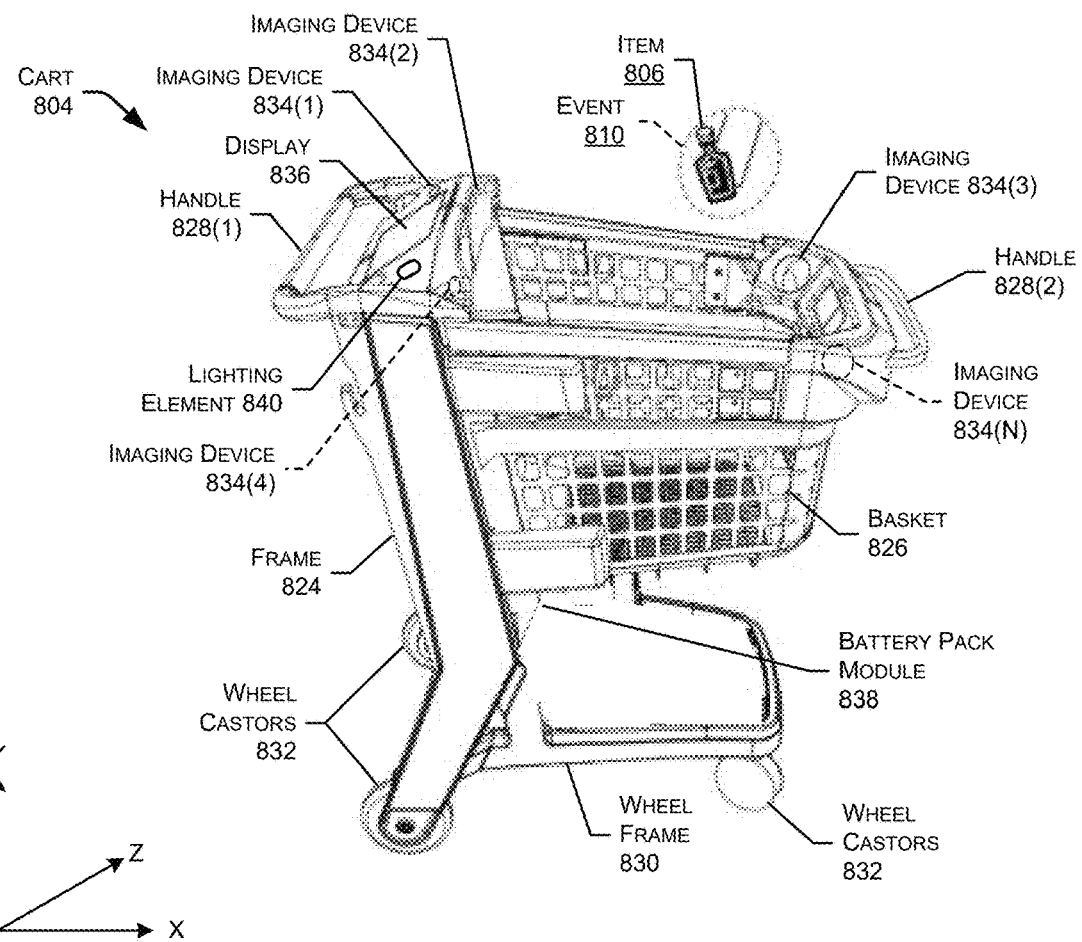
FIG. 8

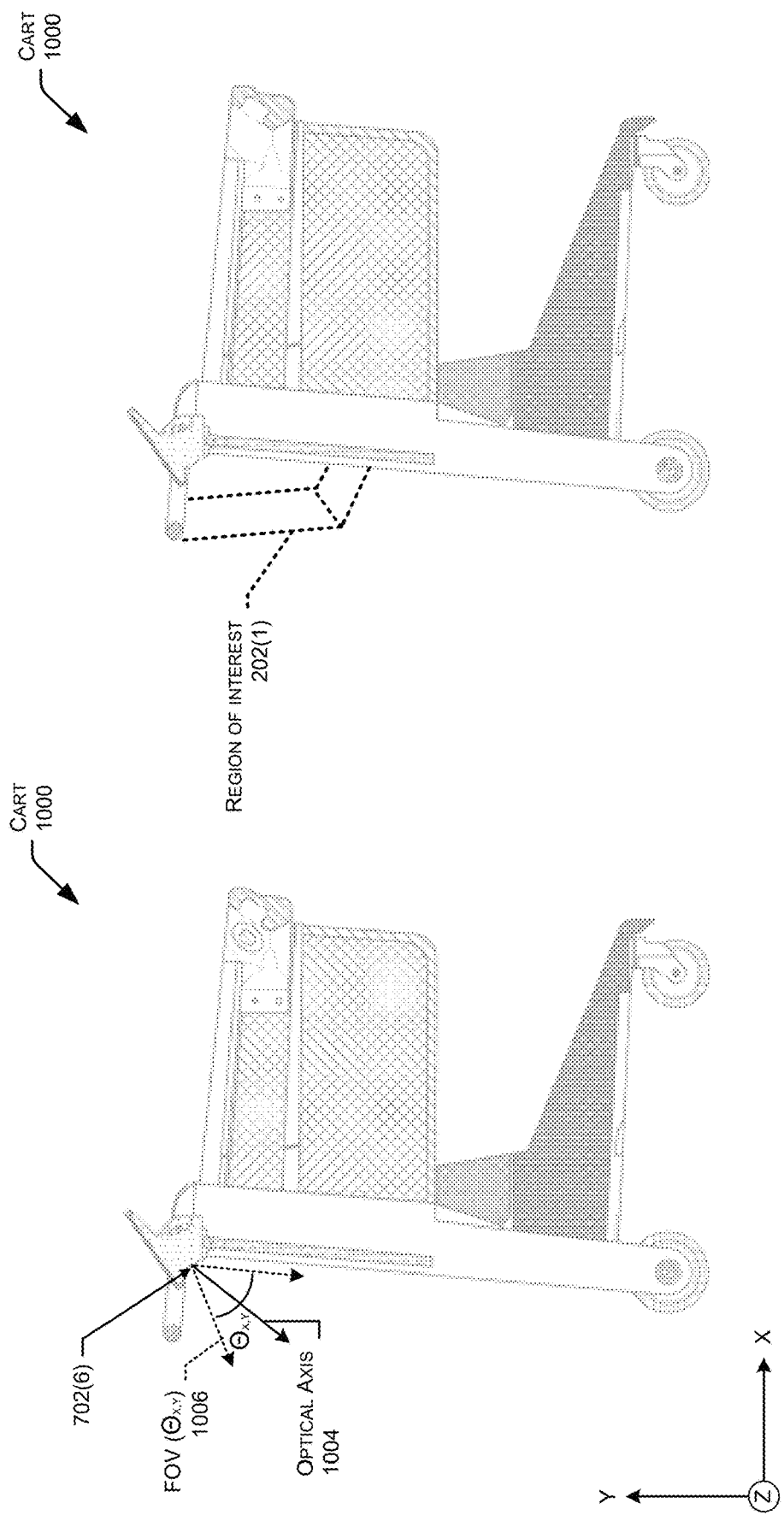

CONSERVING POWER IN ITEM-IDENTIFYING CARTS

BACKGROUND

Materials handling facilities, such as warehouses or retail stores, often provide users with carts to facilitate the processes by which the users locate, identify, retrieve, and transport items at the facilities. For example, when a user identifies an item that he or she desires on a shelf or other location within a materials handling facility, the user may remove the item from the shelf or other location, and place the item into a receptacle of a cart before the user continues to travel through the facility in search of additional items. The cart may have a durable frame or structure that is configured to travel on wheels such that users are able to fill the carts with numerous, and potentially heavy, items they desire, and use the mobile cart to transport the items around the materials handling facilitate with ease, rather than having to carry the items.

Traditionally, when the user has finished identifying and retrieving the items he or she desires, the user may transport the items in the cart to a check-out destination within the materials handling facility, such as a distribution station, a cashier, or a dedicated self-checkout stand, and transition the items to a human operator or an automated agent. Typically, the user or the human operator manually removes the items from the cart, scans or otherwise registers the items with the user, and places the items into one or more bags or other item carriers. The user may then use the bags or other item carriers to transport the items to another destination (e.g., to an automobile, workstation, or home) by manually carrying the item carriers to the other destination, or by transporting the item carriers to the destination within the cart.

Thus, retrieving items from shelves or other locations within a materials handling facility, and placing the items into bags or other carriers for transportation to their desired destination (e.g., automobile or home), may be a two-step process. First, the items must be retrieved from the shelves or other storage locations and placed into the cart, and second, the items must be removed from the cart, scanned, and placed into a bag or other item carrier. These intervening actions that are required to transition items from a shelf or other storage location into the bags or other item carrier necessarily slows the process by which items are retrieved from a materials handling facility, and tend to mitigate the advantages that carts provide.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 8 illustrates an example environment of a materials handling facility that includes an item-identifying cart to identify items placed in, and removed from, a basket of the cart by a user. The cart may identify a user operating the cart, may identify items placed into the cart, and may update a virtual shopping cart associated with the user to indicate the items added to the cart.

FIG. 10D illustrates a region of interest near the basket that components of the cart may analyze when attempting to identify items placed into or removed from the basket of the cart.

FIGS. 11A-B illustrate example views of an item-identifying cart that has one or more cameras for identifying items placed in a storage location of the cart that is located beneath the handle and the basket. In addition, FIG. 11B illustrates a region of interest near the storage location that components of the cart may analyze when attempting to identify items placed into or removed from this storage location.

DETAILED DESCRIPTION

Figure 1:
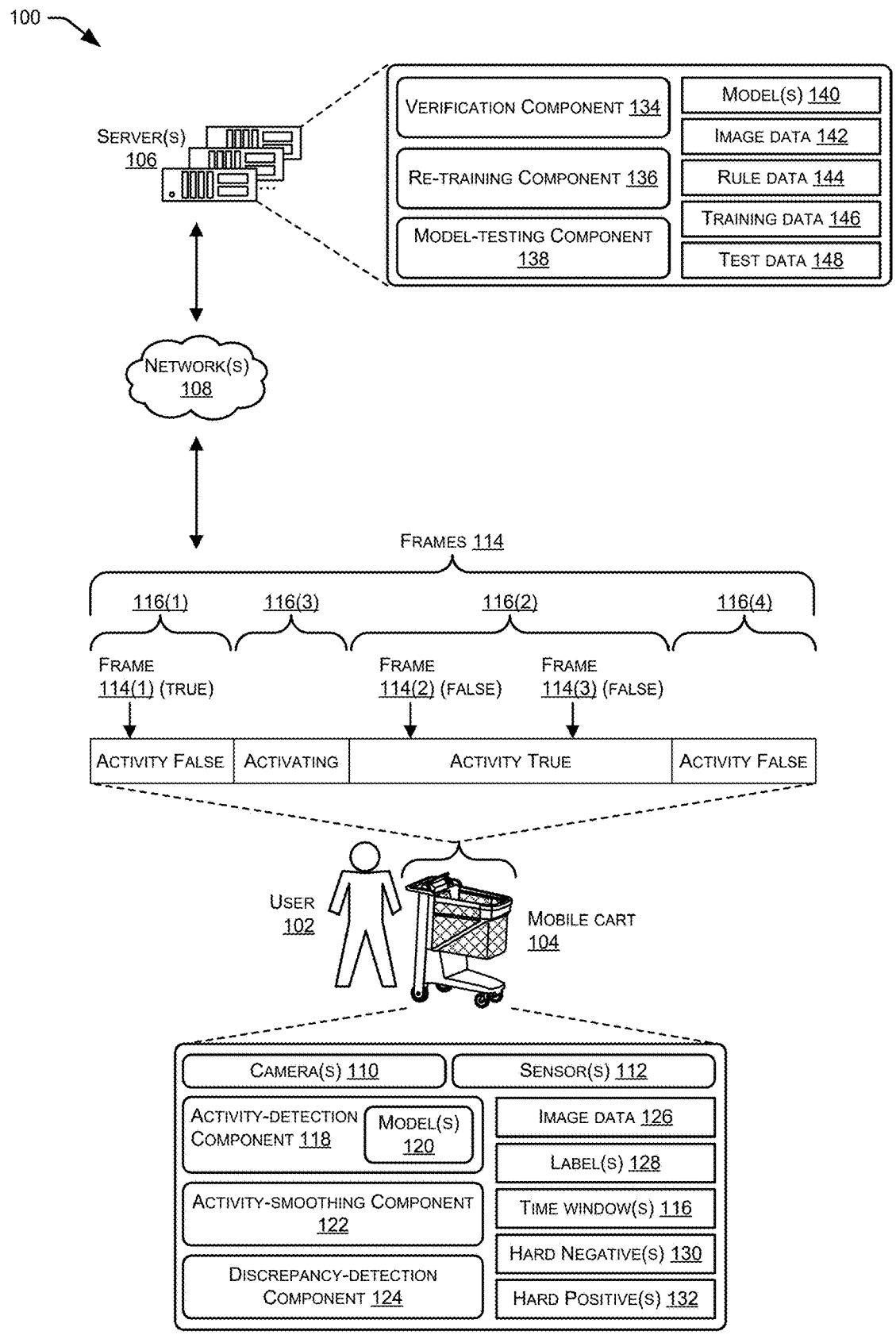
FIG. 1 illustrates an example architecture that includes a user operating a mobile cart within a facility, as well as one or more server computing devices communicatively coupled to the mobile cart or other devices within the facility. As illustrated, the mobile cart may include cameras to generate image data, as well as an activity-detection component using a trained model to determine when there is activity in or near the cart. Upon detecting activity, the mobile cart may begin analyzing or may increase a rate at which the cart analyzes the image data to identify items placed into or removed from the mobile cart. In some instances, the mobile cart identifies frames that may have been misidentified as representing activity or not representing activity and may send these frames to the servers, which may use this data to update the trained model used by the cart for detecting activity.

This disclosure is directed to item-identifying carts that may be utilized by users in material handling facilities to automatically identify items that the users place in their carts as they move around the material handling facilities, as well as to identify the users operating the carts. Upon identifying a user operating a cart and items placed into the cart, the item-identifying cart may update a virtual shopping cart of the user to represent the items that have been placed in, or removed from, the physical cart. According to the techniques described herein, an item-identifying cart (or "smart cart") may include one or more first cameras positioned on a frame of the cart and directed substantially toward a position typically occupied by a user pushing the cart to generate first image data for identifying the user as well as for identifying items placed into a storage location underneath the handle and adjacent or underneath a basket of the cart. For example, the first image data may represent an identifier associated with an account of the user displayed on a mobile device of the user (e.g., a barcode or the like displayed on a mobile phone), facial-recognition data representing the user, gesture data representing the user, and/or the like. The cart may include components for associating the first image data with the user, or the cart may send the first image data to one or more remote servers for determining this association.

In addition, the cart may include one or more second cameras positioned on the frame of the cart to generate second image data representing items that a user places in the cart, and/or removes from the cart. The cart may include one or more components that analyze the image data to determine an item identifier for the item(s) placed in the cart, or removed from the cart, and update a virtual shopping cart for the user of the cart. Once a user has finished their shopping session, the user may be able to efficiently check-out of the materials handling facility (or "facility") without having to scan or otherwise register their items with a cashier or at a designated self-checkout stand. In some examples, the user may simply depart the facility with their items and entirely avoid a traditional checkout experience of a facility, such as a grocery store. For instance, the user may have registered for a user account with the facility that is automatically charged for purchases of the items listed in a virtual shopping cart of the user that were identified by the cart during the user's shopping session.

Similar to traditional carts, such as shopping carts commonly found at grocery stores or other retail establishments, the item-identifying carts described herein may include a durable frame, including or supporting a basket, made of plastic or metal (often having four sides in a quadrilateral shape), multiple wheel castors configured to allow the cart to move on a surface, and one or more handles for a user to push and/or pull the cart around in a facility. However, the carts described herein may include additional hardware and software components that configure the carts to, among other functions, identify items placed in the carts on behalf of the users, and update virtual carts of the users to automate one or more steps of a traditional shopping experience.

For example, an item-identifying cart may include one or more cameras (or other imaging sensors), memory that stores software components for identifying users and/or items and for performing other operations for managing virtual shopping carts, at least one processor to execute the software components, and at least one battery to power the components of the cart. The camera(s) may include one or more first cameras positioned on the frame toward a location where a user would typically push the cart. The one or more first cameras may generate first image data, such as image data of a mobile phone of a user representing visual indicia (e.g., a barcode) associated with an account of the user. Thus, the user may hold up his or her mobile device representing the visual indicia such that the first camera(s) may scan or otherwise generate the first image data. The cart may then identify the account of the user using the first image data or may send the image data to a remote server(s), which may identify the user account using the first image data. Thus, items placed into the cart during a shopping session of the user operating the cart may thereafter be associated with the user account. These first cameras, or other cameras, may also be used to identify items placed into a removed from a storage location underneath the handle of the cart and adjacent to the basket of the cart.

The smart cart may further include one or more second cameras positioned on the frame of the cart such that an optical axis of the second camera(s) is directed towards a location where second image data generated by the second camera(s) represents or captures items that are placed in the cart, and removed from the cart, by a user. Both the second image data generated by the basket-facing cameras and the first image data generated by the handle-facing cameras may be analyzed by the software component(s) of the cart, and/or by remote server(s), using one or more image processing techniques, such as text recognition, object recognition, and/or any other technique. The software component(s) may identify or determine item identifiers for the items represented in the image data, and also determine whether the user is adding items to the cart, or removing items from the cart, and update a virtual shopping cart for the user's shopping session (e.g., add an item to a list of items to be purchased by the user, or remove an item from the list of items to be purchased). In this way, the cart may identify and track items that are retrieved from different locations within the facility, and maintain a virtual shopping cart, or virtual list, of the items selected by the user to provide a more seamless and efficient checkout experience for the user.

In some instances, the smart cart may also include one or more displays, which in some instances may reside adjacent the first camera(s) such that the display is viewable by the user operating the cart. The display may present content that is customized for the user at least partly in response to the cart identifying the user via the first image data. For example, upon the cart or the remote server(s) identifying the user operating the cart, the display may present information associated with the user, such as a shopping list of the user, a name of the user, account information associated with the account of the user, and/or the like. Furthermore, in some instances the display may present location-specific information. For example, if the cart determines that it is located in a particular location of a store, such as near a produce section, the display may present information regarding the particular location, such as cost of produce items near the cart. In another example, the display may present information such as promotions occurring on items that reside adjacent the location of the cart. In some instances, the presented promotions may also be determine based on information associated with the user (e.g., a past purchase history, preferences, etc.), current contents of the cart, and/or the like.

In some examples, the cart may have a frame that includes, or supports, a basket comprising a bottom having quadrilateral shape, one or more (e.g., four) sides protruding from the bottom to define an interior cavity, and a top having a perimeter that defines an opening to receive items placed in the interior cavity of the basket. One or more second cameras may be positioned on the basket of the cart to generate image data representing the items placed in the cart. In some examples, the cameras may be included in respective capture assemblies that include other components, such as light sources (e.g., light emitting diodes (LEDs)) to active and emit light on the items such that the items are illuminated in the image data to help improve processing of the image data to identify the items. In other instances, the cameras may reside adjacent the light sources.

Although the cameras may be positioned anywhere on the cart, in some examples, the basket of the cart may have cameras disposed proximate to each of the four corners of the perimeter of the top of the basket. In this way, the entire cart may be represented in the various field-of-views (FOVs) of the cameras, which also may not be obstructed as the basket of the cart fills up with items. The cameras may, in some examples, be internal to the basket, or otherwise define a relatively small protrusion from the form-factor of the basket, such that the carts may still be capable of "nesting" together in a line when stored at a facility, similar to traditional shopping carts.

Due to the battery life constraints of the cart, it may be advantageous to refrain from having the cameras and/or light sources operating for large periods of time to detect an image being placed in the cart. Thus, in some examples the cart may additionally include one or more proximity sensors (e.g., time-of-flight (ToF) sensors, passive infrared (PIR) sensors, etc.) that generate sensor data to detect movement of an item in, or out, of the cart while the cameras and light sources are de-activated or in a low-power state. In this way, proximity sensors, which may consume less power than the cameras and/or light sources, may detect movement proximate the cart before the cameras and/or light sources are activated.

Thus, the cart described herein may include four cameras disposed at or proximate to the four corners of the perimeter of the basket of the cart. To detect items placed in the cart, or removed from the cart, the cameras may have respective optical axes (e.g., imaginary line along which light propagates through the capture assembly) that are oriented towards an interior of the perimeter of the top of the cart (e.g., towards the middle or centroid of the perimeter of the cart). By orienting the cameras inward with respect to the perimeter of the top of the cart, only items that pass through (e.g., in or out) of the opening of the basket may be represented in image data of the cameras.

The cameras may additionally be oriented to face in a particular vertical direction. For instance, the optical axes of the cameras may, in some examples, be directed downward towards the bottom of the basket to identify when items are placed in the bottom of the basket or taken from the bottom of the basket. For example, some of the carts described herein may include an over-the-basket structural element that couples to a left side and a right side of frame, with a middle portion of this structural element including a camera having an FOV directed substantially downwards into the basket. In addition, this over-the-basket element further include one or more light sources (e.g., LEDs) directed downwards and, in some instances, one or more lighting elements that a user or associate of the facility may selectively turn on to indicate different states of the cart, such as a state in which a user is requesting assistance, a state in which an age of the user is to be verified prior to sale of an item placed into the cart, and/or the like.

In some examples the optical axes of the basket-facing cameras may be directed upward relative to the top of the basket of the cart. For example, the top of the basket of the cart may be disposed in a substantially horizontal plane. The optical axes of the cameras may be directed along the horizontal plane, or upward relative to the horizontal plane, such that the proximity sensors detect the items, and the cameras generate image data representing the items, while the items are at or above the top of the basket (and prior to being placed in a bag or other item carrier). Accordingly, the optical axis of the four example cameras may be directed towards an interior of the perimeter of the top of the basket (e.g., towards a middle or centroid of the perimeter of the basket), and upward relative to a horizontal plane in which the top of the basket is disposed. In this way, the FOVs for each of the cameras may at least partially overlap at a location above, and potentially central to, the perimeter of the top of the cart to define a "sweet spot", "target zone", or "region of interest" where items are detected and/or captures by all four of the cameras. The handle-facing cameras, meanwhile, may generally be oriented toward a handle of the cart and downwards such that the FOVs of these cameras results in the these cameras generating image data of a user operating the cart and placing or removing items into or from a storage location underneath the handle.

To utilize a smart cart as described above, a user may have registered for a user account with an operator of the facility to utilize various automated management services provided by an operator of the facility. For instance, the user may have registered for a user account to automate payments made for items taken by the user and included a payment means (e.g., credit card, bank account number, etc.), and may have also provided an identification means such that the facility, or carts, can recognize the user. For instance, the user may have registered to identify themselves to the cart using any identification technique, such as presenting an identification means to the first camera/scanner positioned on the frame of the cart (e.g., presenting a driver's license, presenting a facility-issued card, presenting a user identifier via a mobile phone, etc.), speaking a predefined utterance (e.g., a name of the user, a predefined keyword, etc.), and/or looking into the first camera for facial recognition. Once a user has identified themselves to a smart cart, the user may begin a shopping session where the smart cart identifies and track items retrieved by the user and placed in the smart cart.

In some instances, the cart may be configured to determine when a user is not proximate the cart (e.g., not within a predefined threshold distance of the cart) and, in response, may turn off or otherwise lessen the amount of power consumed by the one or more components of the cart. For instance, the cart may power off or down image-processing components configured to analyze image data and identify items and actions represented therein, and/or any other hardware, software, and/or firmware components of the cart.

In examples where the smart cart includes proximity sensors, the smart cart may continuously operate the proximity sensors to detect movement of items above the top of the cart. The proximity sensors may generate sensor data that indicates whether an item or object is with a threshold range of distances from the top of the cart (e.g., within 6 inches, within 1 foot, within 2 feet, etc.). The sensor data may be analyzed to detect an item above the perimeter of the top of the cart and trigger the light sources to begin illuminating light and the cameras to begin generating image data. The image data generated by the second camera(s) may be analyzed by the software components to determine whether or not an item is being placed in the cart or removed from the cart. For instance, the image data may represent, over time, movement of the item into the cart, or out of the cart. Additionally, the image data may be analyzed using various techniques to determine an item identifier. Various techniques may be utilized to process image data for identifying the item identifier of the item, such as text recognition, object recognition, and/or other techniques. Upon determining the item identifier, such as determining that the item corresponds to "Strawberry Yogurt," the software components on the cart may store an indication that the item identifier was added to the cart, or removed from the cart, and update a virtual shopping cart accordingly.

After the user has moved throughout the materials handling facility and selected the items they desire to purchase or otherwise take from the facility, the user may end the shopping session in various ways. For instance, the user may return the cart to a cart corral, provide input to the cart indicating an end of the shopping session (e.g., utterance, utilize a user interface element on a touch display, etc.), or simply remove their bags or other item carriers from the cart and leave the facility. After the user has ended their shopping session, the list of item identifiers in the virtual shopping cart may be uploaded to one or more remote servers that manage user accounts for users of the facility. The servers may charge the appropriate user account for the listing of the items in the virtual shopping cart that the user took from the facility.

As introduced above, the smart carts described herein may include one or more cameras for identifying items placed into, or removed from, the respective cart for updating a virtual cart of items associated with a user operating the cart. For instance, an example smart cart may include one or more first cameras directed towards a handle of the cart for identifying items placed into, or removed from, a storage location underneath the handle and at least partly underneath the basket, as well as one or more second cameras directed towards the basket for identifying items placed into, or removed from, the basket. In each instance, the cameras generate image data that may be analyzed by an activity-detection component executing on the smart cart or another device for determining whether the image data represents a predefined activity, such as a user interacting in a region of interest, which may comprise a certain three-dimensional (3D) space adjacent the basket and/or the storage location beneath the handle. If the activity-detection component detects a threshold amount of activity, then an item-identification component executing on the smart cart or another computing device may begin analyzing subsequent image data to attempt to identify items placed into or removed from the cart, or may increase a frame rate at which the item-identification component performs this analysis.

For instance, the activity-detection component may receive an individual frame of data, may generate feature data associated with the frame, and may input this feature data into a trained machine-learning model configured to output an indication of whether the frame represents the predefined activity or not. To make this determination, the model may have been trained using training data that has been labeled to indicate whether each respective frame of the training data represents the predefined activity or does not represent the predefined activity. After training, the model may determine a likelihood that each input frame of image data represents the predefined activity, may compare this likelihood to a threshold, and may output an indication that the frame represents the activity if the likelihood is greater than the threshold or otherwise satisfies one or more criteria. If the likelihood is not greater than the threshold or does not satisfy the one or more criteria, then the model may output an indication that the frame does not represent the predefined activity.

The activity-detection component may store, for each frame, an indication of whether the respective frame was determined to represent the predefined activity. The activity-detection component may then determine, based on these stored indications, whether the predefined activity is occurring at the cart or not. For instance, in a beginning phase, the activity-detection component may store an indication that the cart is currently not experiencing the predefined activity, but may begin analyzing the individual frames to determine whether each frame represents activity. The activity-detection component may then identify that the predefined activity is occurring if, for instance, a threshold number of frames within a sliding window of frames have been determined to represent the predefined activity. For instance, the activity-detection component may analyze the prior ten or other number of frames to determine whether a threshold number (e.g., eight frames) have been determined to represent the predefined activity. If so, then the activity-detection component may store an indication that the cart is currently experiencing the predefined activity, meaning that a user likely reaching into the basket area or other storage location of the cart, potentially to add an item to the cart or remove an item from the cart. Thus, the activity-detection component may store an indication that a transition has occurred from a no-activity time window to a time window associated with the predefined activity.

After identifying the activity time window, the activity-detection component may also send an indication of the detected activity to the item-identification component. In response to receive this indication, the item-identification component may begin analyzing subsequent image data to attempt to identify an item placed into or removed from the cart, or may increase a rate at which this analysis is performed. As will be appreciated, during times of no activity (as determined by the activity-detection component), the item-identification component may be turned off or may operate at a reduced frame rate, thus conserving battery power consumed by the item-identification component. However, upon the activity-detection component identifying activity, the item-identification component may power on or may begin operating at a higher frame in order to increase the likelihood of accurately identifying items placed into or removed from the cart.

In some instances, the item-identification component may analyze each frame of image data using an item- or barcode-localization component, that may identify a region of an individual frame of data that includes an item or a barcode. After such a region has been identified, a reader component of the item-identification component may analyze this region to attempt to identify the item itself, for instance by identifying the barcode of the item, text printed on the item, a shape of the item, or the like.

Meanwhile, during the activity window, the activity-detection component may continue to analyze individual frames of image data to determine whether each respective frame represents the predefined activity. The activity-detection component may continue to store respective indications of whether each individual frame represents the predefined activity. In some instances, the activity-detection component may then determine, based on these stored indications, whether the predefined activity is no longer occurring at the cart. For instance, the activity-detection component may determine whether a threshold number of frames within a sliding window of frames have been determined to not represent the predefined activity. For instance, the activity-detection component may analyze the prior ten or other number of frames to determine whether a threshold number (e.g., seven frames) have been determined to not represent the predefined activity. If so, then the activity-detection component may store an indication that the cart is no longer experiencing the predefined activity, meaning that a user is likely no longer reaching into the basket area or other storage location of the cart, potentially to add an item to the cart or remove an item from the cart. Thus, the activity-detection component may store an indication that a transition has occurred from an activity time window to a no-activity time window associated with the activity.

After identifying the no-activity time window, the activity-detection component may also send an indication of this change to the item-identification component. In response to receiving this indication, the item-identification component may cease analyzing subsequent image data to attempt to identify an item placed into or removed from the cart, or may decrease a rate at which this analysis is performed. By turning off or decreasing the rate at which the item-identification component operates during time windows of no activity, battery power of the cart may be conserved without sacrificing the accuracy of the item-identification component.

As noted above, the activity-detection component identifies activity on a frame-by-frame basis by inputting feature data associated with an individual frame into a model that has been trained using labeled training data. The activity-detection component then identifies time periods of the predefined activity by analyzing a result of these individual frames over a sliding window of time. In some instances, however, the model utilized by the activity-detection component may misidentify one or more individual frames as including activity in instances where they do not, and/or may misidentify one or more individual frames as not including activity in instances where they do. As described below, however, an example smart cart may identify these potential misidentifications, which may be used to re-train the model utilized by the activity-detection component in order to increase the accuracy of this model.

As noted above, the activity-detection component may analyze a sliding window of labels (activity/no activity) applied to prior frames to determine whether the smart cart is currently experiencing an activity window or a no-activity window. Thus, the activity-detection component may identify instances where a frame is identified as representing activity during a time window that is not associated with the activity, and may also identify instances where a frame is identified as not representing activity during a time window that is associated with the activity. The cart may store these frames along with their respective activity/no-activity determinations for potential later user in retraining the activity-detection model. For instance, the cart may send, to a server computing device coupled to the cart: (i) those frames that have been identified as representing activity during a time window that is not associated with the activity, and (ii) those frames that have been identified as not representing activity during a time window that is associated with the activity.

Upon receiving these frames, the server computing device may determine whether the activity-detection component correctly or incorrectly analyzed each of these individual frames. For instance, the server computing device may reanalyze each frame that was determined to represent activity during a time period that is not associated with activity to determine whether that frame in fact represented the predefined activity (e.g., a user placing or removing an item from the cart). In order to make this determination, the server computing device may determine whether the frame represents a body part (e.g., a hand), whether the frame represents a 3D object within the region of interest (e.g., near the basket), whether the frame represents a barcode or item, and/or the like. If the server computing device determines that this frame does in fact represent activity, then the server computing device may take no further action this frame, given that the server has determined that the activity-detection component operating on the cart accurately characterized this frame. If, however, the server computing device determines that the frame does not represent the activity, then the server computing device may re-label the frame as not representing the predefined activity and may store this re-labeled frame as training data for re-training and, thus, updating the model, as discussed above.

In addition, the server computing device may reanalyze each frame that was determined to not represent activity during a time period that is associated with activity to determine whether that frame in fact did not represent the predefined activity (e.g., a user placing or removing an item from the cart). In order to make this determination, the server computing device may determine whether the frame represents a body part (e.g., a hand), whether the frame represents a 3D object within the region of interest (e.g., near the basket), whether the frame represents a barcode or item, and/or the like. If the server computing device determines that this frame does not represent activity, then the server computing device may take no further action this frame, given that the server has determined that the activity-detection component operating on the cart accurately characterized this frame. If, however, the server computing device determines that the frame does represent the activity, then the server computing device may re-label the frame as representing the predefined activity and may store this re-labeled frame as training data for re-training and, thus, updating the model, as discussed above.

After re-labeling and storing the frames that the activity-detection component misidentified (and filtering out the remaining frames that the component accurate identified), the server computing device may then use these re-labeled frames as part of training data for generating an updated activity-detection model. That is, these frames may be added to a set of training data to improve the accuracy of the model. After re-training the model, the server computing device may then test the newly generated (or updated) model on a set of test data having known labels to determine an accuracy (or efficacy rate) of the updated model. If this efficacy rate is greater than the efficacy rate of the current model employed by the smart carts in their respective facilities, the server computing device may send this updated model to the smart carts such that they begin utilizing a more-accurate model, leading to better activity detection and, thus, performance of these smart carts.

While some of the examples below describe an activity-detection component operating as software to identify frames that the model operating on the cart may have misidentified, it is to be appreciated that the activity-detection techniques may additionally or alternatively be performed in hardware in some instances. For instance, a hardware component may be used to identify activity within one or more regions of interest, with the hardware component outputting different voltages to indicate whether activity has been detected. It is to be appreciated that the techniques for improving the accuracy of the model used for performing activity detection may be performed regardless of whether activity detection occurs in hardware, software, or a combination thereof.

It is also to be appreciated that the techniques for correcting the misidentified frames and retraining the model(s) may be performed in real-time, in an offline manner, or in any other manner. For instance, the carts described herein may send the potentially misidentified frames up to the servers for analysis in response to identifying these frames. In other instances, the carts may send these frames up at a later time and the servers may analyze the data in an offline manner. In these instances, the servers may analyze a larger window of frames (e.g., five frames, ten frames, etc.) to identify potentially misidentified frames. That is, the servers may perform the techniques on a frame-by-frame basis or may operate across a larger window of frames. Regardless of the implementation, the techniques may improve the accuracy of the models utilized by the carts as introduced above and described in detail below.

Although some of the techniques described below are performed locally on the cart, in other examples, some or all of the techniques may be performed by one or more backend devices or servers associated with the facility. For instance, the sensor data and/or image data may be collected at the cart and sent over network(s) to backend devices at the facility, or server devices located remote from the facility, to be processed remotely. However, in some instances it may be advantageous for at least some of the processing to be performed on the cart to reduce latency in identifying items placed in the cart. For instance, it may be advantageous to have low latency when requesting that a user provide feedback to help identify an item recently placed in the cart, rather than the user continuing their shopping session and being asked later about an item. Further, although some of the techniques described below are performed on backend devices, in other examples, some or all of the techniques may be performed by locally on the cart. For instance, the techniques described above and below for generating updated models may be performed in whole or in part on the smart cart(s), rather than or in addition to on the server computing devices.

Further, while various techniques described below are with reference to purchasing items in a retail facility, the techniques are generally applicable to any materials handling facility in which a user may place items in a cart. Further, the following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example architecture 100 that includes a user 102 operating a mobile cart 104 within a facility, as well as one or more server computing devices (or "servers") 106 communicatively coupled to the mobile cart 104 or other devices within the facility over one or more networks 108. As illustrated, the mobile cart 104 may include cameras 110 to generate and store image data 126 and, potentially, one or more additional sensors 112 to generate additional sensor data. As illustrated, the mobile cart 104 may analyze individual frames 114 of the image data 126 using a trained machine-learning model to identify time windows where activity is occurring proximate to the cart 104 and/or to identify time windows where no activity is occurring proximate the cart 104. For instance, the cart 104 may analyze the frames 114 to determine time windows where predefined activity is occurring near a basket of the cart or other storage location, such as a user reaching into the airspace of the basket or other storage location. Further, while FIG. 1 illustrates the mobile cart using the trained machine-learning model to analyze the frames 114, in other instances the servers 106 and/or one or more other computing devices may analyze the frames using one or more trained machine-learning models. For instance, the cart 104 may send the image data to the servers 106, which may analyze the frames 114 to determine predefined activity within individual frames and to determine time windows associated with the predefined activity and time windows that are not associated with the predefined activity. Thus, it is to be appreciated that the techniques described below with reference to both training (and retraining) models and using the models to identify activity may be performed on the carts 104, at the servers, and/or at one or more other computing devices.

Returning to FIG. 1, this figure illustrates that the cart 104 has determined a first time window 116(1) that is not associated with a predefined activity (labeled here as "Activity False"), as well as a time window 116(2) where the cart 104 has determined that the predefined activity is occurring ("Activity True") and a time window 116(3) between these two respective time windows ("Activating"). Finally, in this example, the cart has also identified another time window 116(4) where the predefined activity has ceased (again labeled as "Activity False"). As introduced above and discussed in further detail below, upon the cart 104 identifying the activity window 116(2), the cart may begin analyzing the image data 126 to attempt to identify an item placed into or removed from the basket or other storage location of the cart 104, or may increase a frame rate associate with this analysis.

In some instances, however, the cart 104 may identify discrepancies between the determination made for an individual and the determination made for a window within which the frame occurs. For instance, FIG. 1 illustrates that the cart 104 has identified, as discrepancies, a frame 114(1) as representing activity (labeled "True") during the window 116(1) not associated with activity and frames 114(2) and 114(3) as not representing activity (labeled "False") during the time window 116(2) associated with activity. That is, while the cart 104 has determined that the time window 116(1) as a whole did not represent the predefined activity, the cart has determined that the frame 114(1) did represent activity. Conversely, while the cart 104 has determined that the time window 116(2) as a whole did represent the predefined activity, the cart has determined that the frames 114(2) and 114(3) did not represent activity. Thus, the cart 104 may store these discrepancies for later, more detailed analysis to determine whether these frames were accurately or inaccurately labeled by the trained model. If it is later determined that one or more of these frames were inaccurately determined by the model, then the labels associated with these frames may be changed to match the new determination and these newly labeled frames may be stored as training data for re-training the model in hopes of increasing the accuracy of the model.

In order to perform these techniques, FIG. 1 illustrates that the mobile cart 104 may include an activity-detection component 118 storing at least one trained machine-learning model 120 for analyzing frames of image data 126 generated by the cameras 110. For instance, the activity-detection component 118 may generate feature data for individual frames of the image data 126 may input this feature data into the model 120, which may be trained to output respective labels 128 indicating whether each individual frame represents the predefined activity. For instance, the model 120 may have been trained using frames of image data 126 each labeled to indicate whether the frame represents the predefined activity ("true" or "false").

In addition, the mobile cart may include an activity-smoothing component 122 that receives, as input, an indication of the determination of activity or no-activity on a frame-by-frame basis from the activity-detection component 118 and, in response, determines when to declare an activity window and when to declare a no-activity window (collectively stored as "windows 116"). For instance, the activity-smoothing component 122 may determine and declare an activity window, such as the activity window 116(2), upon determining that a threshold amount of frames within a window of frames of a predetermined size have been associated, by the activity-detection component 118, with a label 128 indicating that the frame represents activity. For instance, the activity-smoothing component 122 may analyze a sliding window of the ten most recent frames (or any other number of frames) and may determine an activity window upon a threshold number (e.g., eight) frames of the sliding window of ten frames have been determined by the activity-detection component 118 to represent activity.

Further, after determining and declaring an activity window, the activity-smoothing component 122 may determine when to declare a no-activity window, such as the window 116(4). Again, the activity-smoothing component 122 may determine and declare a no-activity window upon determining that a threshold amount of frames within a window of frames of a predetermined size have been associated, by the activity-detection component 118, with a label 128 indicating that the frame does not represent activity. For instance, the activity-smoothing component 122 may analyze a sliding window of the ten most recent frames (or any other number of frames) and may determine a no-activity window upon a threshold number (e.g., eight) frames of the sliding window of ten frames have been determined by the activity-detection component 118 to not represent activity. In some instances, the size of the sliding window and associated threshold may be the same between determining activity and no-activity windows, while in other instances they may differ.

FIG. 1 further illustrates that the mobile cart may include a discrepancy-determination component 124, which may function to identify discrepancies between the labels applied to individual frames and the windows in which these frames occur. For instance, the discrepancy-determination component 124 may identify those frames that have been determined by the activity-detection component 118 to represent activity in windows that have not been determined to represent activity. In some instances, the discrepancy-determination component 124 may store these discrepancies as "hard negatives 130". The discrepancy-determination component 124 may also identify those frames that have been determined to not represent activity in windows that have been determined to represent activity. In some instances, the discrepancy-determination component 124 may store these discrepancies as "hard positives 132". In some instances, the mobile cart 104, the servers 106, and/or one or more other computing devices may re-analyze these hard negatives 130 and hard positives 132 to determine whether the activity-detection component 118 accurately determined the respective label of each of these frames. If not, these frames may be re-labeled and then used as training data to update the model 120 or another model used by the activity-detection component 118.

In this example of FIG. 1, for instance, the mobile cart 104 may send the hard negatives 130 and hard positives 132 to the servers 106 for re-analysis and, potentially, for using as training data. As illustrated, the servers 106 may include a verification component 134, a re-training component 136, and a model-testing component 138. The servers 106 may further store one or more models 140 for use by the cart 104 and other carts, image data 142 received from the cart 104 and other carts, rule data 144 for determining whether to re-label a hard negative or positive, training data 146 for training the models 140, and test data for testing the accuracy (or efficacy) of the models 140.

The verification component 134 may function to re-analyze each received hard negative 130 and hard positive 132 to determine whether the activity-detection component 118 correctly labeled each of these frames. For instance, the verification component 134 may re-analyze the image data 142 associated with each of these frames to determine whether they include activity or not. In some instances, the verification component may analyze the respective image data to determine when a particular 3D volume in the image frame corresponding to a region of interest (e.g., above or in a basket or other storage location of the cart 104) includes an object, whether the image data represents a body part, whether the image data represents a barcode or item, or the like. As will be appreciated, the verification component 134 may use one or more trained machine-learning models to make this determination. Further, the verification component 134 may analyze the rules data 144 to determine whether or not to label a particular image frame as including activity. The rules data 144 may store any number of rules regarding whether a frame is to be labeled as including activity based on the resulting analysis of the image frame. For instance, the rules data 144 may include a rule indicating that a frame that includes an object in the region of interest is to be labeled as representing activity, that an image frame that includes a body part is to be labeled as representing activity, that an image frame that includes a barcode or item is to be labeled as representing activity, and/or so forth.

Upon the verification component 134 determining that the activity-detection component 118 of the mobile cart has correctly labeled a particular hard positive or hard negative, the verification component 134 may discard or filter out this image frame. That is, the servers 106 may determine that the cart 104 accurately identified what was presumed as a discrepancy and, thus, that data point might not be used to re-train the model in some instances. In instances where the verification component 134 determines that the activity-detection component 118 of the mobile cart has incorrectly labeled a particular hard positive or hard negative, the verification component 134 may re-label this frame and store this re-labeled frame as training data 146 for use in re-training the model(s) 140. The re-training component 136 may then use the training data 146 to re-train the model(s) 140, which now include the correctly labeled hard negatives 130 and hard positives 132. The re-training component 136 may generate a new model based on the re-training of an existing model using the now-supplemented training data 146.

After a new model 140 has been generated, the model-testing component 138 may determine whether the new model is more accurate than the model(s) currently being used by the cart 104 and/or other carts. To do so, the model-testing component 138 may apply the newly generated model 140 to test data 148 that is associated with known and accurate labels to determine an accuracy or efficacy of the model. Upon determining this accuracy or efficacy, the model-testing component 138 may determine whether this accuracy or efficacy is greater than an accuracy or efficacy of the model 120 currently being used by the cart 104 and/or other mobile carts. If so, then the servers 106 may, upon some trigger event, send the newly generated model to the cart 104 and/or other carts for use by the activity-detection component 118. The activity-detection component 118 may thus be more accurate in labeling frames as including activity or not and, thus, the activity-smoothing component 122 may be more accurate in identifying activity windows and no-activity windows.

Figure 2A:
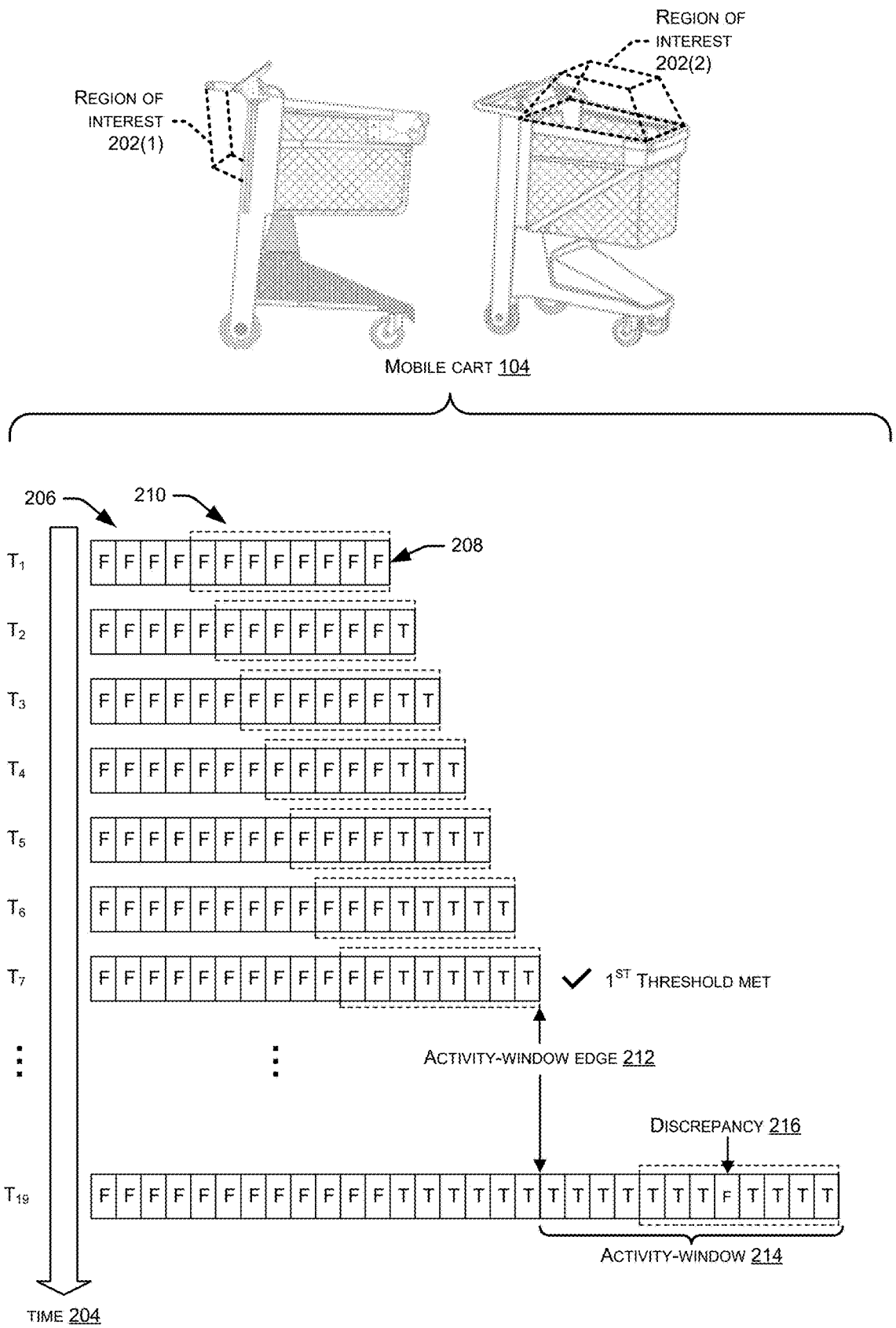
FIG. 2A illustrates an example schematic diagram of a mobile cart analyzing frames of image of data to detect activity and, upon identifying a threshold amount of frames that represent activity, determine an activity window. In addition, this diagram illustrates the mobile cart identifying frames where a model utilized by the mobile cart may have misidentified a frame that includes activity as not representing activity. The mobile cart may store this frame and associated information for later use in re-training the model to improve the accuracy of the model.

FIG. 2A illustrates an example schematic diagram of the mobile cart 104 analyzing frames of image of data to detect activity and, upon identifying a threshold amount of frames that represent activity, determine an activity window. In addition, this diagram illustrates the mobile cart 104 identifying frames where a model utilized by the mobile cart 104 may have misidentified a frame that includes activity as not representing activity. The mobile cart 104 may store this frame and associated information for later use in re-training the model to improve the accuracy of the model.

As illustrated, the mobile cart 104 may be associated with one or more regions of interest, such as a region of interest 202(1) and a region of interest 202(2), that the cart 104 may monitor for determining activity therein for the purpose of powering on or up an item-identification component for identifying items placed into or removed from the cart. As illustrated, the region of interest 202(1) may be adjacent to and/or include a storage location of the cart under the handle of the cart and generally adjacent and underneath the basket, while the region of interest 202(2) may be adjacent to and/or include the basket of the cart 104.

As described above, the cart 104 may include cameras that generate image data, and the activity-detection component 118 may utilize a model 120 to determine, for individual frames of the image data, whether the respective frame represents activity. In this regard, the activity-detection component 118 may store an indication of a label associated with the frame indicating with the frame represents activity. For instance, the activity-detection component 118 may store, in association with each individual frame, a label of "true" (indicating that the frame represents the activity on which the model 120 has been trained) or "false" (indicating that the frame does not represent the activity). In addition, the activity-smoothing component 122 may analyze a sliding window of the most recent image frames and, based on their labels determine whether to declare an activity window or a no-activity window.

FIG. 2A, for instance, illustrates an example timeline 204 during which the activity-detection component 118 and the activity-smoothing component 122 may analyze frames of image data to determine activity and no-activity windows. For example, FIG. 2A illustrates that at a time $T_1$ the activity-detection component has determined a label for each image frame of an example set 206 of twelve image frames, each of which the activity-detection component 118 has labeled as "false" indicating that the respective frame does not include the predefined activity, as determined by the trained model 120, including a most-recently generated and analyzed frame 208. In addition, FIG. 2A illustrates that the activity-smoothing component may analyze a sliding window 210 of the most-recently generated and analyzed image frames for determining whether to declare an activity window. In this example, the sliding window 210 may comprise a most-recent eight frames, although any other number may be used. Further, the threshold number of frames for declaring the beginning of an activity may comprise any number, such as four, six, or the like. In this example, the activity-smoothing component 122 is configured to declare an activity window upon identifying six "true" labels from a previous eight image-frame labels.

At the time $T_1$, all eight of the eight frames of the sliding window 210 have been determined to not represent activity (as each frame is labeled "F" for false) and, thus, the activity-smoothing component stores an indication the window continues to be one of no activity. Next, FIG. 2A illustrates that at a time $T_2$ the next image frame has been determined by the activity-detection component 118 to represent activity. However, the sliding window still only includes one frame labeled as representing the activity of the eight values in the sliding window 210.

Next, at a time $T_2$ the next image frame has been determined by the activity-detection component 118 to represent activity. However, the sliding window still only includes two frames labeled as representing the activity of the eight values in the sliding window 210. Next, at each of times $T_4$-$T_7$ the subsequent image frame has been determined by the activity-detection component 118 to represent activity. At this point, six of the eight frames in the sliding window 210 are labeled as representing the activity of the eight values in the sliding window 210. Thus, the threshold amount of frames representing activity is greater than the threshold and the activity-smoothing component 122 may store an indication of an activity window 214, which may be configured to begin at an activity-window edge 212. After determining the activity window 214, the activity-smoothing component 122 may also send an indication of a the activity window 214 (e.g., a time at which the activity window 214 begins) to an item-identification component configured to begin analyzing the image data for an item represented therein or increase a frame rate of this analysis.

At a time $T_{19}$, meanwhile, FIG. 2A illustrates that while the sliding window 210 still indicates that an activity window 214 exists (e.g., because seven of the eight frames are associated with a label of "true"), the discrepancy-detection component 124 has identified a discrepancy 216 in the form of a "hard positive"—that is, an image frame that has been detected as not representing activity within an activity time window 214. Thus, the discrepancy-detection component 124 may store the discrepancy 216 for later analysis by the cart 104 or the servers 106. In some instances, the discrepancy-detection component 124 or another component of the cart may send each discrepancy to the servers 106 upon detecting a respective discrepancy, while in other instances this component may send the discrepancies as a batch in response to a trigger event (e.g., a time of day, a request from an operator, etc.).

Figure 2B:
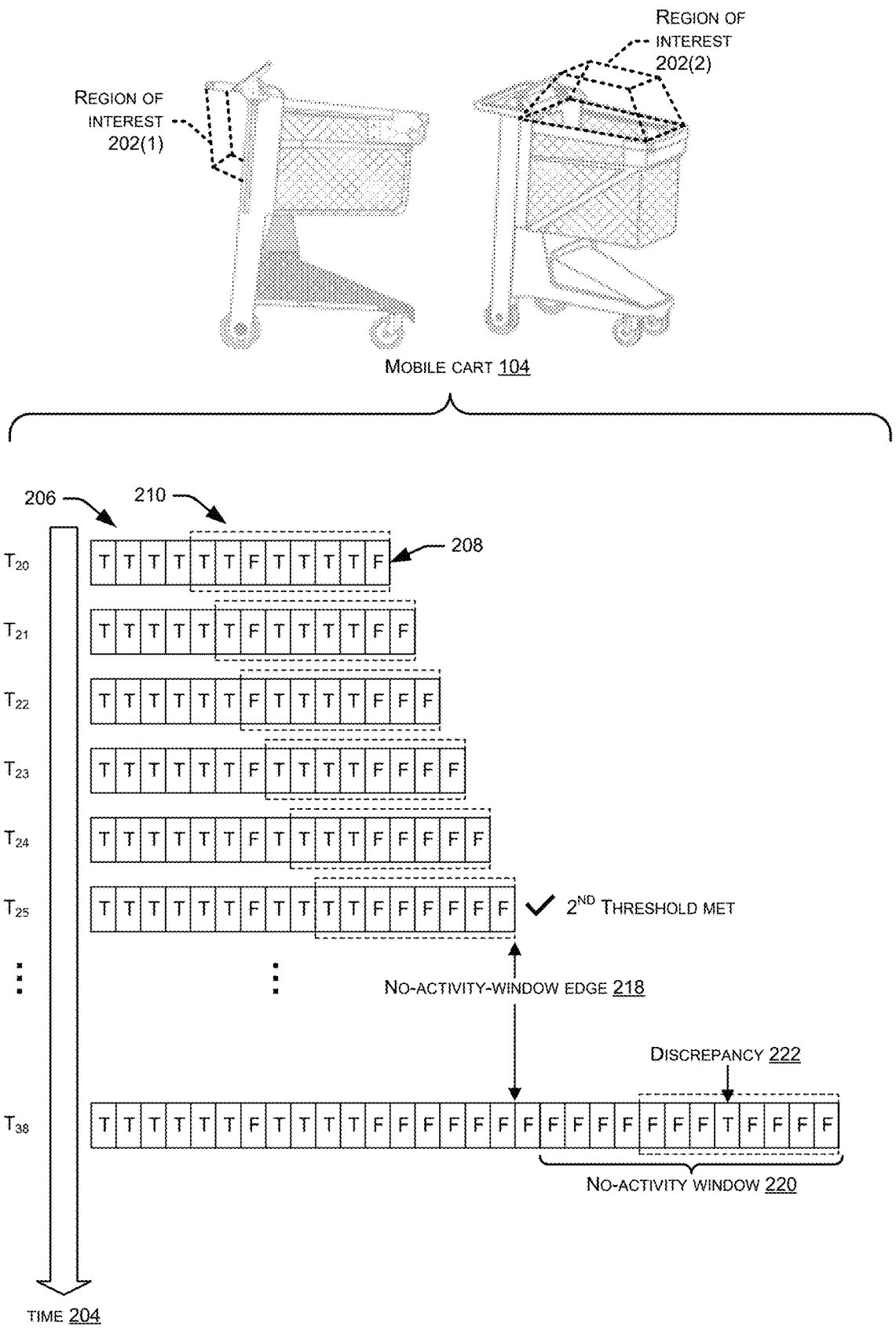
FIG. 2B illustrates an example schematic diagram of a mobile cart analyzing frames of image of data to detect activity and, upon identifying a threshold amount of frames that do not represent activity, determine a no-activity window. In addition, this diagram illustrates the mobile cart identifying frames where a model utilized by the mobile cart may have misidentified a frame that does not include activity as representing activity. The mobile cart may store this frame and associated information for later use in re-training the model to improve the accuracy of the model.

FIG. 2B continues the example analysis. At each of subsequent times $T_{20-25}$ the activity-detection component 118 has determined, by applying feature data of each respective image frame to the trained model 120, that each respective image frame does not represent activity. Thus, at $T_{25}$ the activity-smoothing component 122 determines that a threshold number of frames within the sliding window 210 are labeled as not representing activity and, thus, the component 122 may store an indication of a no-activity window 220 beginning at a no-activity-window edge 218. In addition, the activity-smoothing component 122 may send an indication of the beginning of the no-activity window 220 to the item-identification component, which may cease or otherwise slow a rate at which this component attempts to identify items or barcodes within the subsequent image frames.

At a time $T_{38}$, however, FIG. 2B illustrates that one of the image frames within the no-activity window 220 has been labeled as including activity. That is, the frame associated with the time $T_{34}$ was determined by the activity-detection component 118 to include activity. Thus, the discrepancy-detection component 124 identifies this image frame as another discrepancy 222 in the form of a "hard negative"—that is, an image frame that has been detected as representing activity within a no-activity time window 220. Thus, the discrepancy-detection component 124 may store the discrepancy 222 for later analysis by the cart 104 or the servers 106.

Figure 3A:
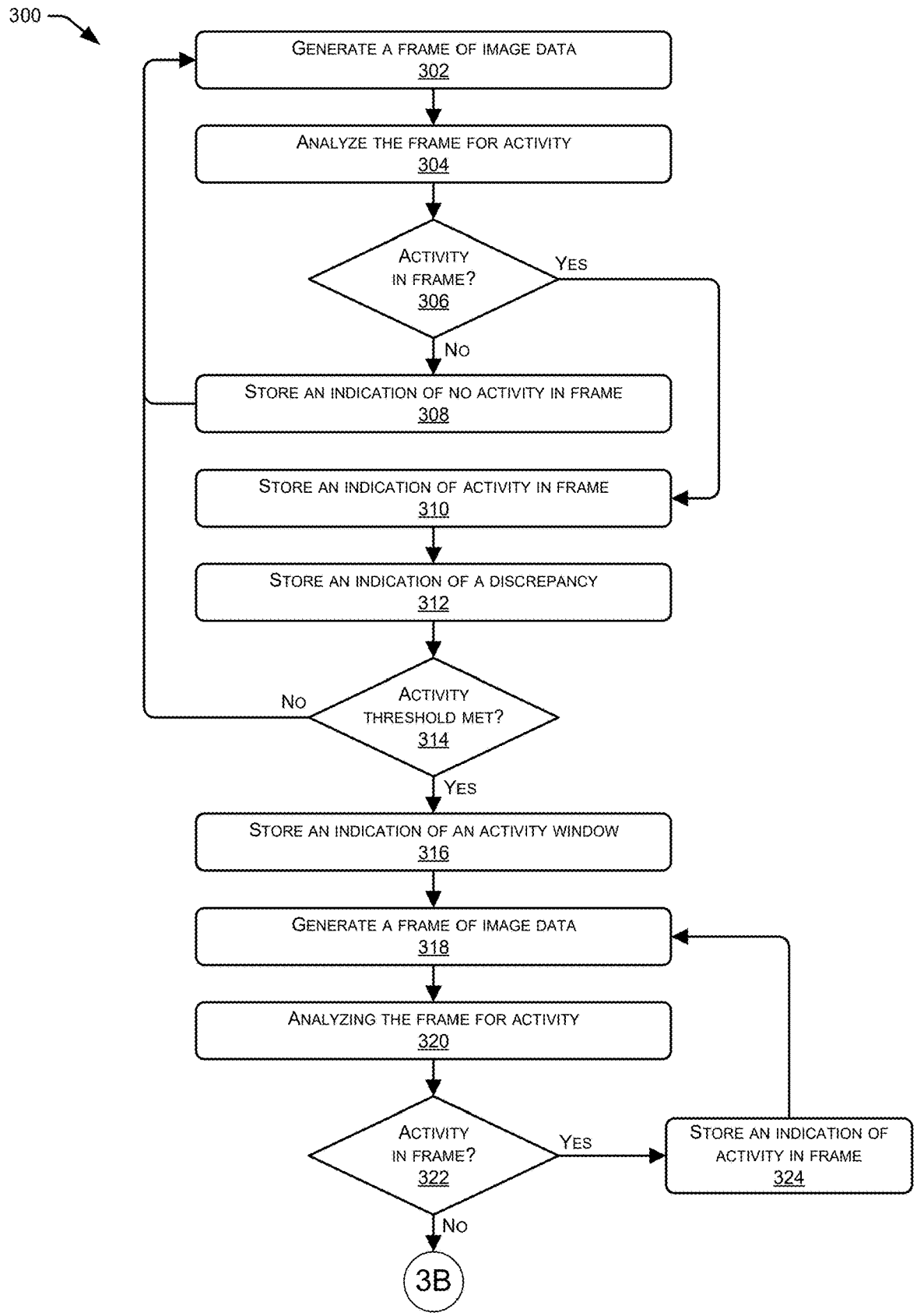
FIGS. 3A-B collectively illustrate a flow diagram of an example process for analyzing frames of image data to detect activity, as well as identify discrepancies where a trained model utilized to analyze the image data may have incorrectly identified a frame as representing activity or not representing activity.
Figure 3B:
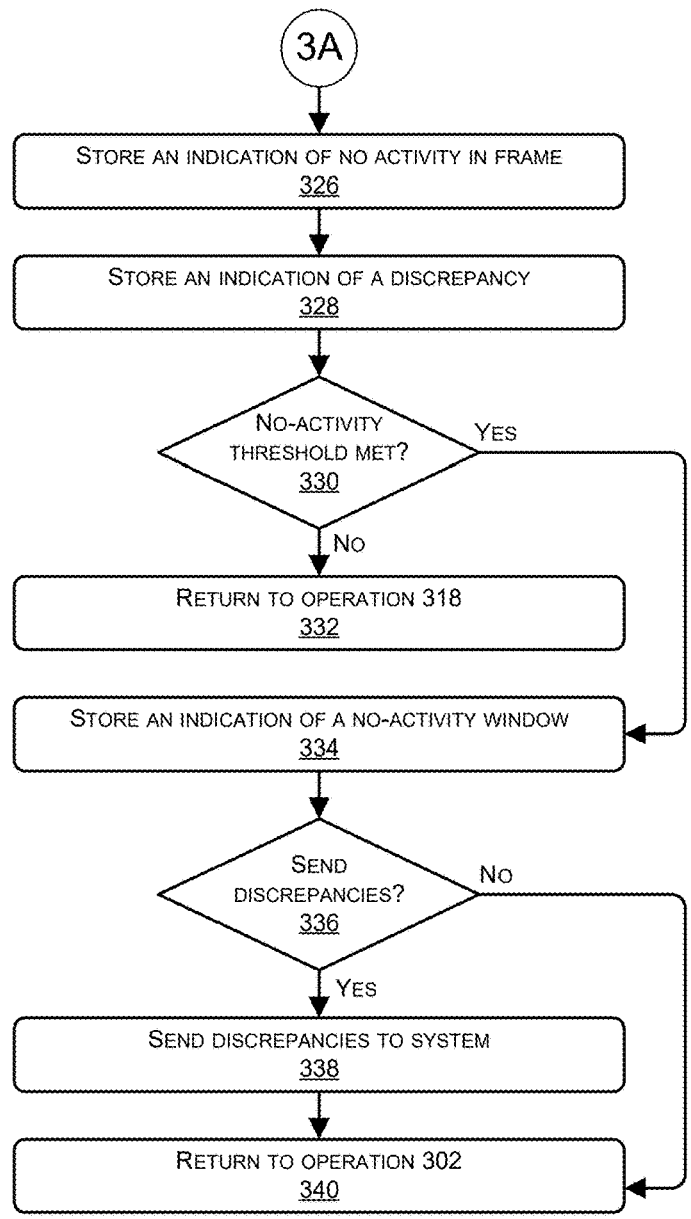

FIGS. 3A-B collectively illustrate a flow diagram of an example process 300 for analyzing frames of data to detect activity, as well as identify discrepancies where a trained model utilized to analyze the image data may have incorrectly identified a frame as representing activity or not representing activity. The process 300, as well as each process discussed herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In addition, these processes may be performed by the mobile cart 104, the servers 106, other computing devices, or a combination thereof. It is also to be appreciated that this process 300, as well as the other processes and techniques described throughout this disclosure, may be performed in real-time, near-real-time, offline, and/or in any other manner.

An operation 302 represents one or more cameras of a mobile cart 104 generating a frame of image data. As described above, these camera(s) may be oriented towards a basket or other storage location of the cart 104. An operation 304 represents analyzing the image frame for activity. This operation may comprise the activity-detection component 118 generating feature data and inputting the feature data into a trained model 120 configured to output an indication of whether the frame represents predefined activity for which the model 120 has been trained to identify. An operation 306 represents determining whether the frame is determined to represent activity. If not, an operation 308 represents storing an indication of no activity (e.g., applying a label of "false" to the frame) and the process 300 returns to the operation 302. If, however, activity is detected in the frame, then the process 300 proceeds to an operation 310, which represents storing an indication of activity in the frame (e.g. applying a label of "true" to the frame). In addition, given that the cart 104 is in a no-activity state, which is the state a cart may be associated with until the activity-smoothing component 122 identifies an activity window, an operation 312 represents storing an indication of a discrepancy. While not specifically mentioned as part of this process, it is to be appreciated that certain frames within a threshold distance of a transition between window states (e.g., activity to no-activity or vice versa) might not be stored as discrepancies and later analyzed for updating a model.

Next, an operation 314 represents determining whether an activity threshold has been met or whether criteria associated with declaring an activity window has otherwise been met. For instance, this operation may comprise determining whether a threshold amount of image frames within a most recent amount of image frames have bene labeled as representing activity. If not, then the process 300 returns to the operation 302. If so, however, then the process 300 proceeds to an operation 316, which represents storing an indication of an activity window. This may also include sending an indication of the activity window to one or more additional components, such as an item-identification component. Next, an operation 318 represents generating another frame of image and an operation 320 represents analyzing the frame for activity. Again, this latter operation may comprise the activity-detection component 118 inputting feature data associated with this image frame into the trained model 120 for receiving, as output of the model 120, an indication of whether the image frame represents the predefined activity. An operation 322 represents determining whether the frame has been determined to represent activity. If so, then an operation 324 represents storing an indication of activity in the frame, such as storing a "true" label in association with the image frame, and returning to the operation 318. If activity is not determined in the frame, meanwhile, then the process 300 proceeds to FIG. 3B.

FIG. 3B continues the illustration of the process 300 and includes, at an operation 326, storing an indication that the frame does not include activity. For instance, this operation may comprise storing a "false" label in association with the image frame. Next, an operation 328 represents storing an indication of a discrepancy, given that the frame was determined not to include activity but is associated with an activity window. An operation 330 represents determining whether a no-activity threshold has been met, such as based on the activity-smoothing component 122 determining that a threshold number of frames of a most recent number of frames have been determined to not represent activity. If not, then an operation 332 represents that the process returns to the operation 318. If so, however, then an operation 334 represents storing an indication of a no-activity window, which may include sending an indication of the no-activity window to the item-identification component or another component. Next, an operation 336 represents determining whether to send the stored discrepancies to a system (e.g., one or more computing devices, such as the servers 106). If so, then an operation 338 represents sending the discrepancies to the system and, at an operation 340, returning to the operation 302. If it is determined not to send the discrepancies, then the process 300 proceeds to return to the operation 302 per the operation 340. Of course, while this process 300 describes sending the discrepancies to a system for analyzing and, potentially, using these discrepancies to update a trained model, in some instances the cart 104 may perform this analysis and model-update operation.

Figure 4A:
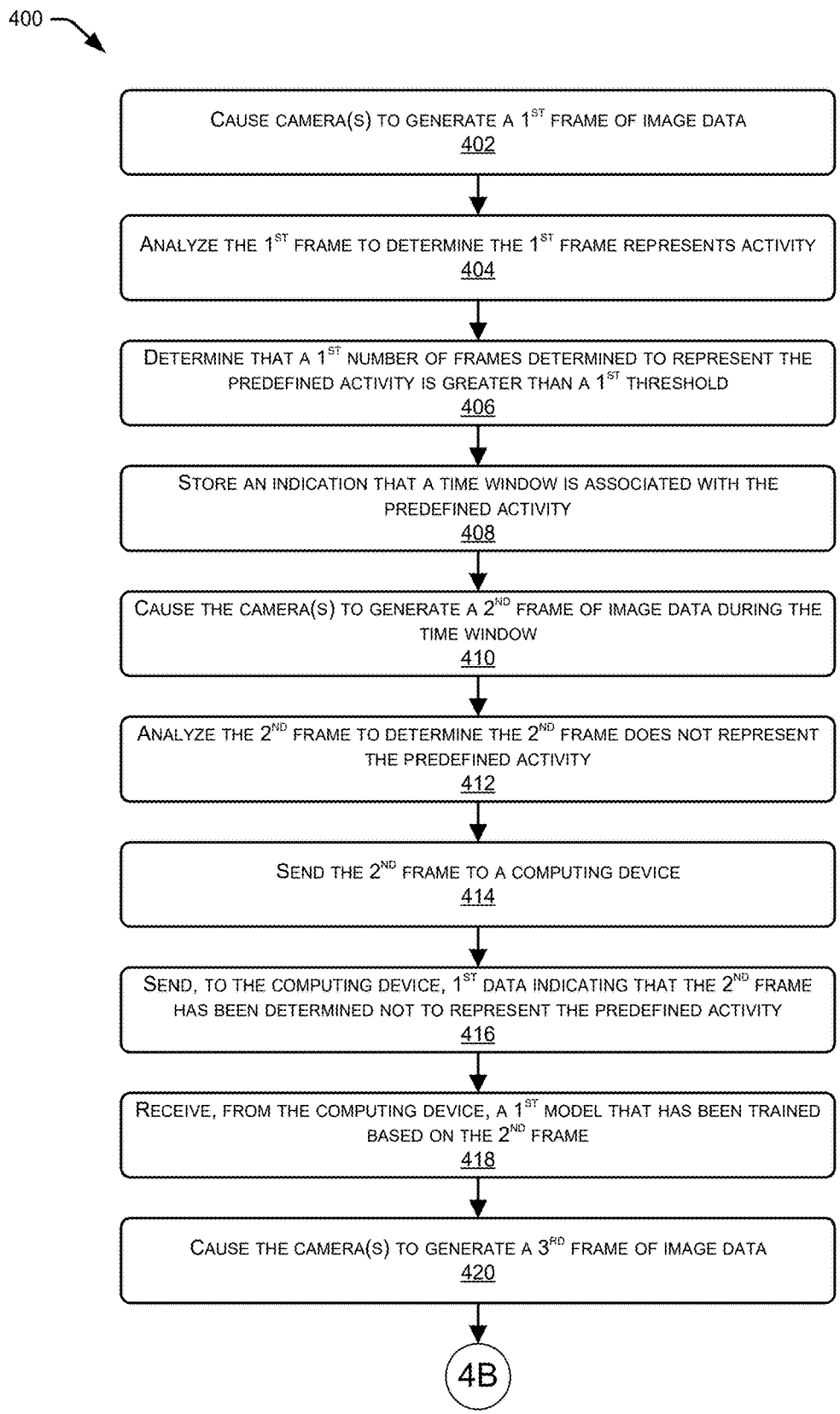
FIGS. 4A-B collectively illustrate a flow diagram of another example process for analyzing frames of image data to detect activity, as well as identify discrepancies where a trained model utilized to analyze the image data may have incorrectly identified a frame as not representing activity.
Figure 4B:
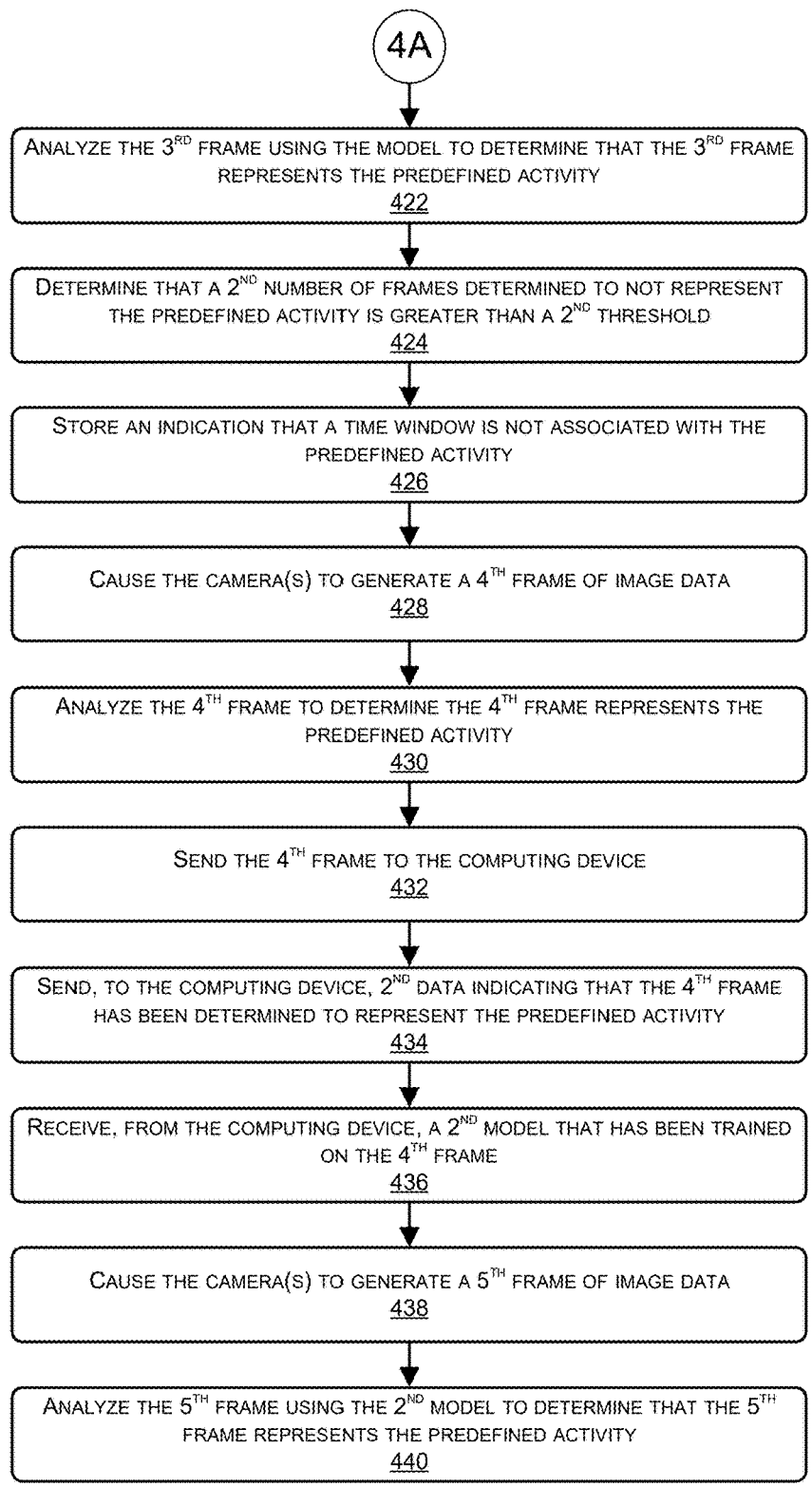

FIGS. 4A-B collectively illustrate a flow diagram of another example process 400 for analyzing frames of data to detect activity, as well as identify discrepancies where a trained model utilized to analyze the image data may have incorrectly identified a frame as not representing activity. In some instances, the process 400 may be performed by the mobile cart 104 and/or the servers 106.

An operation 402 represents causing one or more cameras of a mobile cart to generate a first frame of image data, while an operation 404 represents analyzing the first frame to determine that the first frame represents a predefined activity. For instance, this operation may comprise the activity-detection component 118 inputting feature data associated with the first frame into a trained model 120 to determine whether the frame represents the activity for which the model 120 has been trained to identify. Next, an operation 406 represents determining, after analyzing the first frame to determine that the first frame represents the predefined activity, that a number of frames determined to represent the predefined activity is greater than a first threshold number of frames. For instance, the activity-smoothing component 122 may determine that a threshold number of frames within a number of most-recently generated frames represent the predefined activity. An operation 408 then represents storing an indication that a time window is associated with the predefined activity.

An operation 410 represents causing the one or more cameras to generate a second frame of image data during the time window that is associated with the predefined activity. An operation 412 then represents analyzing the second frame to determine that the second frame does not represent the predefined activity. For instance, this operation may comprise the activity-detection component 118 inputting feature data associated with the second frame into the trained model 120 to determine whether the frame represents the activity for which the model 120 has been trained to identify. An operation 414 represents sending the second frame to a computing device, such as the server(s) 106, while an operation 416 represents sending, to the computing device, first data indicating that the second frame has been determined to not represent the predefined activity and that the second frame is associated with the time window that is associated with the predefined activity. For instance, this operation may comprise sending the frame to the computing device along with an indication that this frame represents a discrepancy, such as a hard positive.

An operation 418 represents receiving, from the computing device, a machine-learning model that has been trained based at least in part on the second frame and a label indicating that the second frame represents the predefined activity. For instance, this model may comprise an update model relative to the model previously used during the process 400. An operation 420 represents causing the one or more cameras to generate a third frame of image data.

FIG. 4B continues the illustration of the process 400 and includes, at an operation 422 analyzing the third frame using the received machine-learning model to determine that the third frame represents the predefined activity. An operation 424 represents determining that a second number of frames determined to not represent the predefined activity is greater than a second threshold number of frames. For instance, the activity-smoothing component 122 may determine that a threshold number of frames within a number of most-recently generated frames do not represent the predefined activity. An operation 426 represents storing an indication that a second time window is not associated with the predefined activity.

An operation 428 represents causing the one or more cameras to generate a fourth frame of image data, while an operation 430 represents analyzing the fourth frame to determine that the fourth frame represents the predefined activity. An operation 432 represents sending the fourth frame to the computing device, while an operation 434 represents sending, to the computing device, second data indicating that the fourth frame has been determined to represent the predefined activity and is associated with a second time window that is not associated with the predefined activity. For instance, this operation may comprise sending the frame to the computing device along with an indication that this frame represents a discrepancy, such as a hard negative.

An operation 436 represents receiving, from the computing device, an updated machine-learning model that has been trained based at least in part on the fourth frame and a label indicating that the fourth frame does not represent the predefined activity. An operation 438 represents causing the one or more cameras to generate a fifth frame of image data, while an operation 440 represents analyzing the fifth frame, using the machine-learning model received at the operation 436, to determine that the fifth frame represents the predefined activity.

Figure 5:
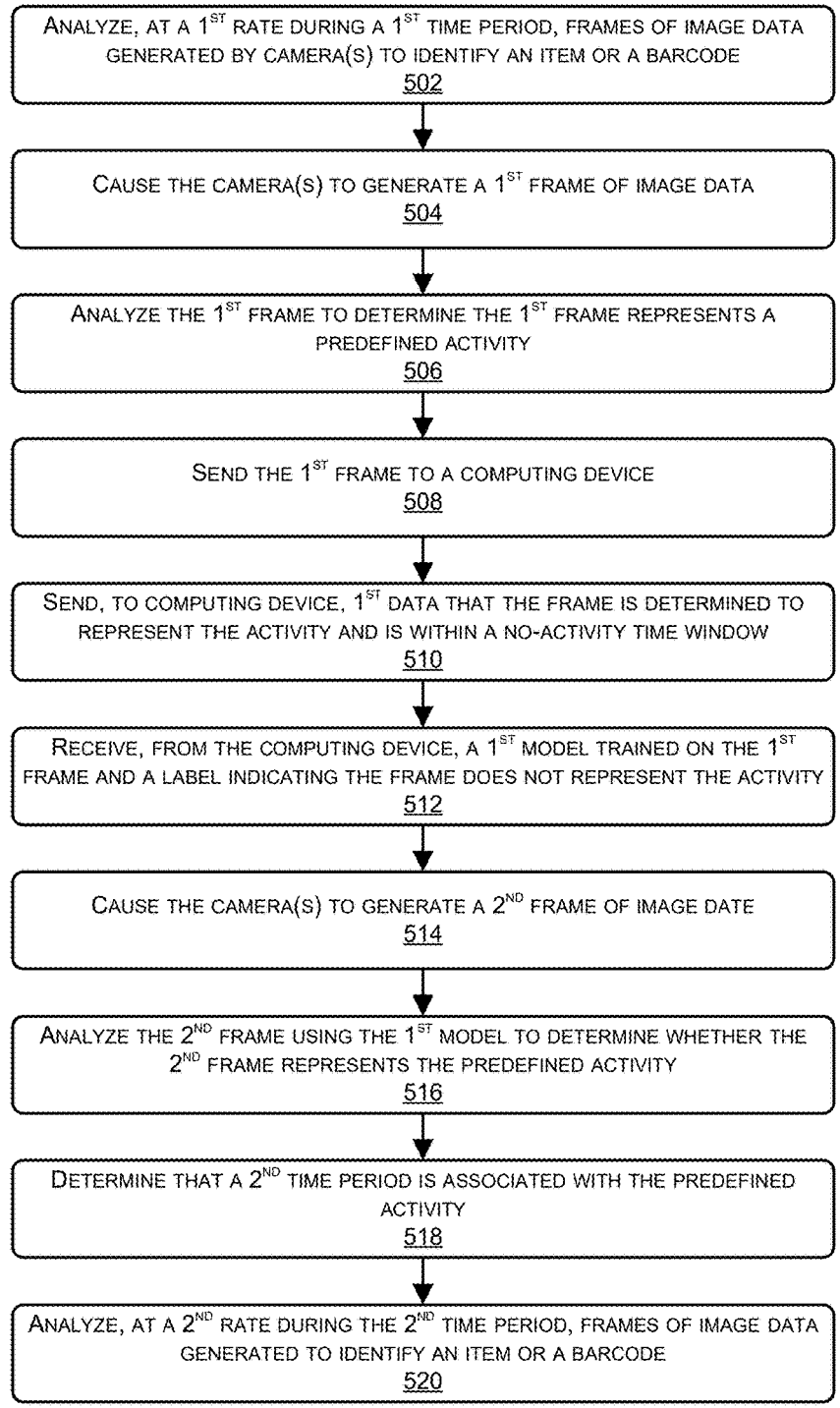
FIG. 5 illustrates a flow diagram of another example process for analyzing frames of image data to detect activity, as well as identify discrepancies where a trained model utilized to analyze the image data may have incorrectly identified a frame as representing activity.

FIG. 5 illustrates a flow diagram of another example process 500 for analyzing frames of data to detect activity, as well as identify discrepancies where a trained model utilized to analyze the image data may have incorrectly identified a frame as representing activity. In some instances, the process 400 may be performed by the mobile cart 104 and/or the servers 106.

An operation 502 represents analyzing, at a first rate during a first time period, frames of image data generated by the one or more cameras to identify at least one of an item or a barcode. For instance, an item-identification component executing on the mobile cart 104 may analyze the image data to at this first rate. An operation 504 represents causing one or more cameras of the mobile cart to generate a first frame of image data, while an operation 506 represents analyzing the first frame to determine that the first frame represents a predefined activity. For instance, the activity-detection component 118 may use a model stored on the mobile cart to perform this analysis.

An operation 508 represents sending the first frame to a computing device, such as the server(s) 106, while an operation 510 represents sending, to the computing device, first data indicating that the first frame has been determined to represent the predefined activity and that the first frame is associated with a time window that is not associated with the predefined activity. For instance, this operation may comprise sending the frame to the computing device along with an indication that this frame represents a discrepancy, such as a hard negative.

An operation 512 represents receiving, from the computing device, an updated machine-learning model that has been trained based at least in part on the first frame and a label indicating that the first frame does not represent the predefined activity. An operation 514 represents causing the one or more cameras to generate a second frame of image data, while an operation 516 represents analyzing the second frame using the newly received machine-learning model to determine whether the second frame represents the predefined activity.

An operation 518 determining that a second time period subsequent to the first time period is associated with the predefined activity. For instance, this operation may comprise the activity-smoothing component 122 determining that a threshold number of frames within a most recent number of analyzed frames have been labeled as representing the activity. Next, and potentially in response, an operation 520 represents analyzing frames of image data generated by the one or more cameras during the second time period to identify at least one of an item or a barcode at a second rate that is greater than the first rate. For instance, the item-identification component may increase a rate at which it analyzes the image data to identify an item or barcode based on receiving the indication that an activity window has been detected by the activity-smoothing component 122.

Figure 6:
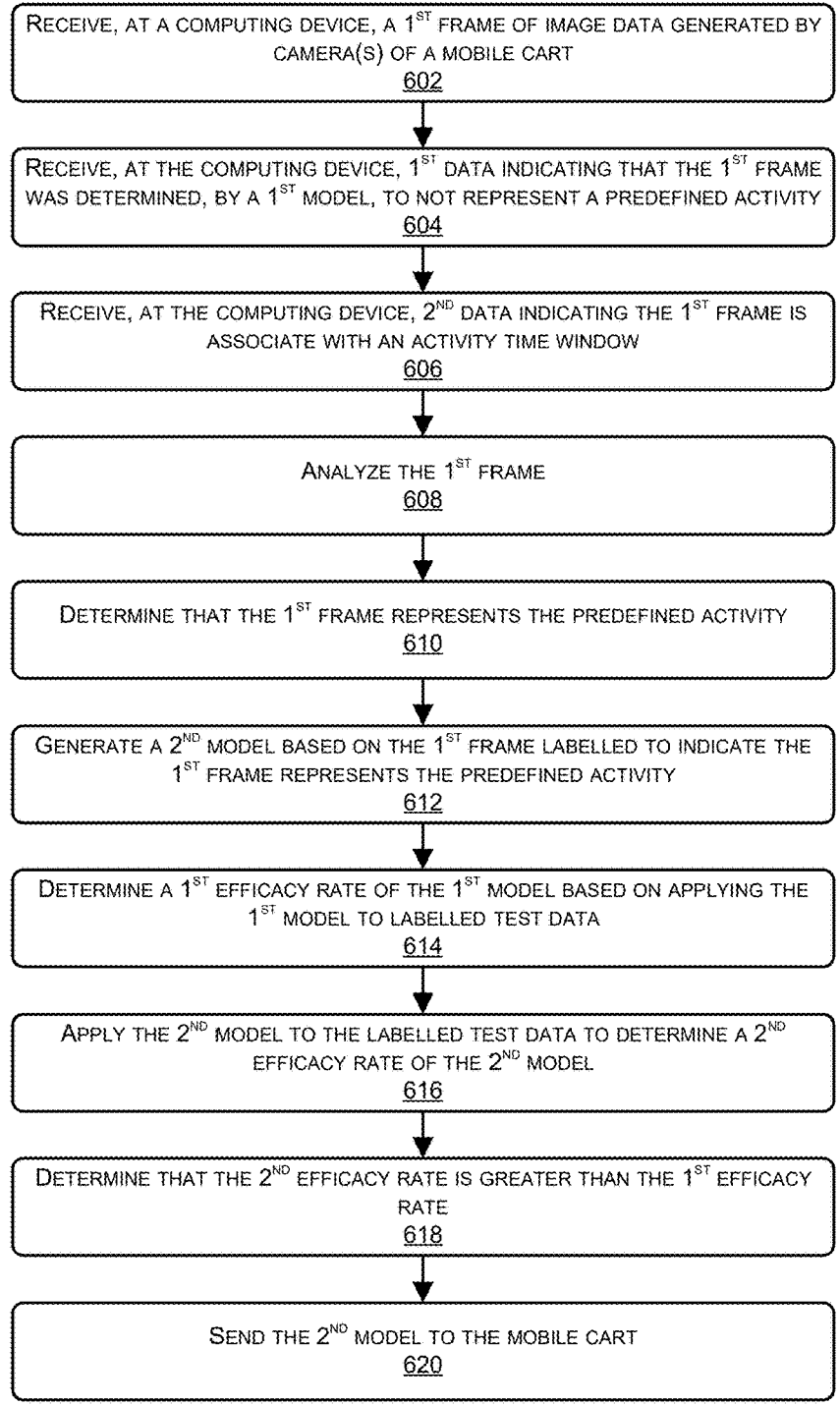
FIG. 6 illustrates a flow diagram of an example process for using new training data generated from misidentified frames to generate an updated model to more accurately identify activity proximate a mobile cart or otherwise.

FIG. 6 illustrates a flow diagram of an example process 600 for using new training data generated from misidentified frames to generate an update model to more accurately identify activity within a mobile cart or otherwise. In some instances, the process 400 may be performed by the mobile cart 104 and/or the servers 106.

An operation 602 represents receiving, at a computing device (e.g., the server(s) 106), a first frame of image data generated by one or more cameras of a mobile cart, while an operation 604 represents receiving, at the computing device, first data indicating that the first frame was determined, by a first machine-learning model operating on the mobile cart, to not represent a predefined activity. Next, an operation 606 represents receiving, at the computing device, second data indicating that the first frame is associated with a time window that was determined to represent the predefined activity, the time window associated with at least a second frame of image data that was determined by the first machine-learning model to represent the predefined activity. An operation 608 represents analyzing the first frame.

An operation 610 represents determining, based at least in part on the analyzing, that the first frame represents the predefined activity. For instance, the verification component 134 of the server(s) 106 may analyze the first frame to detect a body part, an object with a predefined 3D volume, an item or barcode, or the like, such that the server(s) determine that the first frame represents the predefined activity. An operation 612 represents generating a second machine-learning model based at least in part on the first frame and a label indicating that the first frame represents the predefined activity. For instance, the re-training component 136 of the server(s) 106 may generate a new model by using the re-labeled first frame as training data.

An operation 614 represents determining a first efficacy rate of the first machine-learning model, the first efficacy rate based at least in part on applying the first machine-learning model to labeled test data. For instance, the model-testing component 138 of the server(s) 106 may determine an accuracy of the first model by applying the first model to the test data having labels that are known to be correct. An operation 616 represents applying the second-machine-learning model to the labeled test data to determine a second efficacy rate associated with the second machine-learning model. For instance, the model-testing component 138 of the server(s) 106 may determine an accuracy of the second model by applying the second model to the test data having labels that are known to be correct. An operation 618 represents determining that the second efficacy rate is greater than the first efficacy rate and, in response, an operation 620 represents sending the second model to the mobile cart 104 and/or one or more other mobile carts. In some instances, the server(s) 106 may send the updated model to the cart 104 and/or other carts in response to determining a triggering event, such as a time of day, day of the month, percentage increase in accuracy between an existing model and a new model, and/or the like.

Figure 7A:
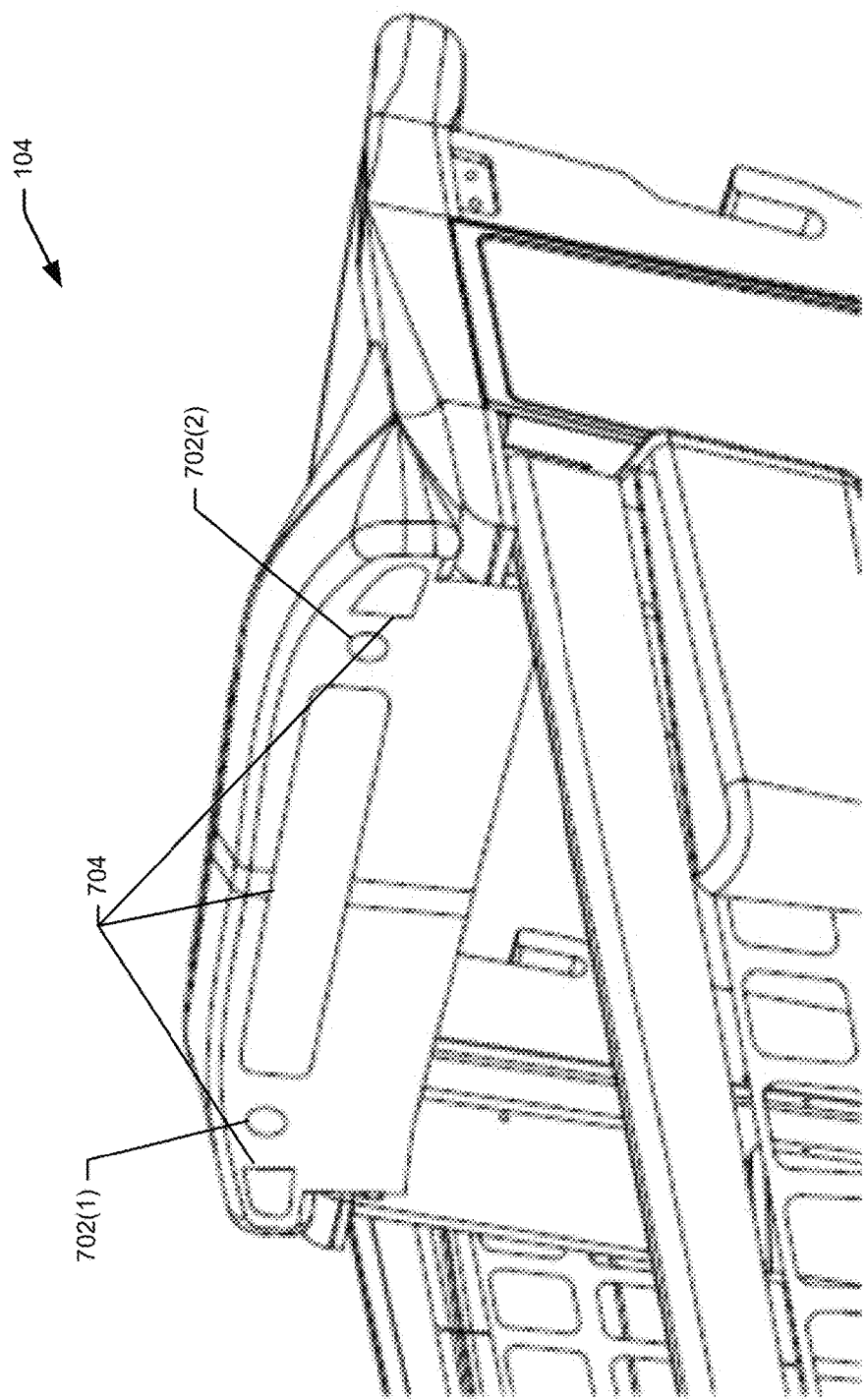
FIG. 7A illustrates an example mobile cart that includes cameras pointed toward a basket of the cart for generating image data that may be used to determine when a user is placing an item into or removing an item from the basket, as well as to identify the item and a quantity of the item.

FIG. 7A illustrates additional details of an example mobile cart 104. As illustrated, the example mobile cart 104 includes cameras 702(1) and 702(2) pointed toward a basket of the cart for generating image data that may be used to determine when a user is placing an item into or removing an item from the basket, as well as to identify the item and a quantity of the item. As illustrated, the cart 104 may also include one or more light sources 704 between the cameras 702(1) and 702(2), to the left of these cameras, and/or to the right of these cameras.

Figure 7B:
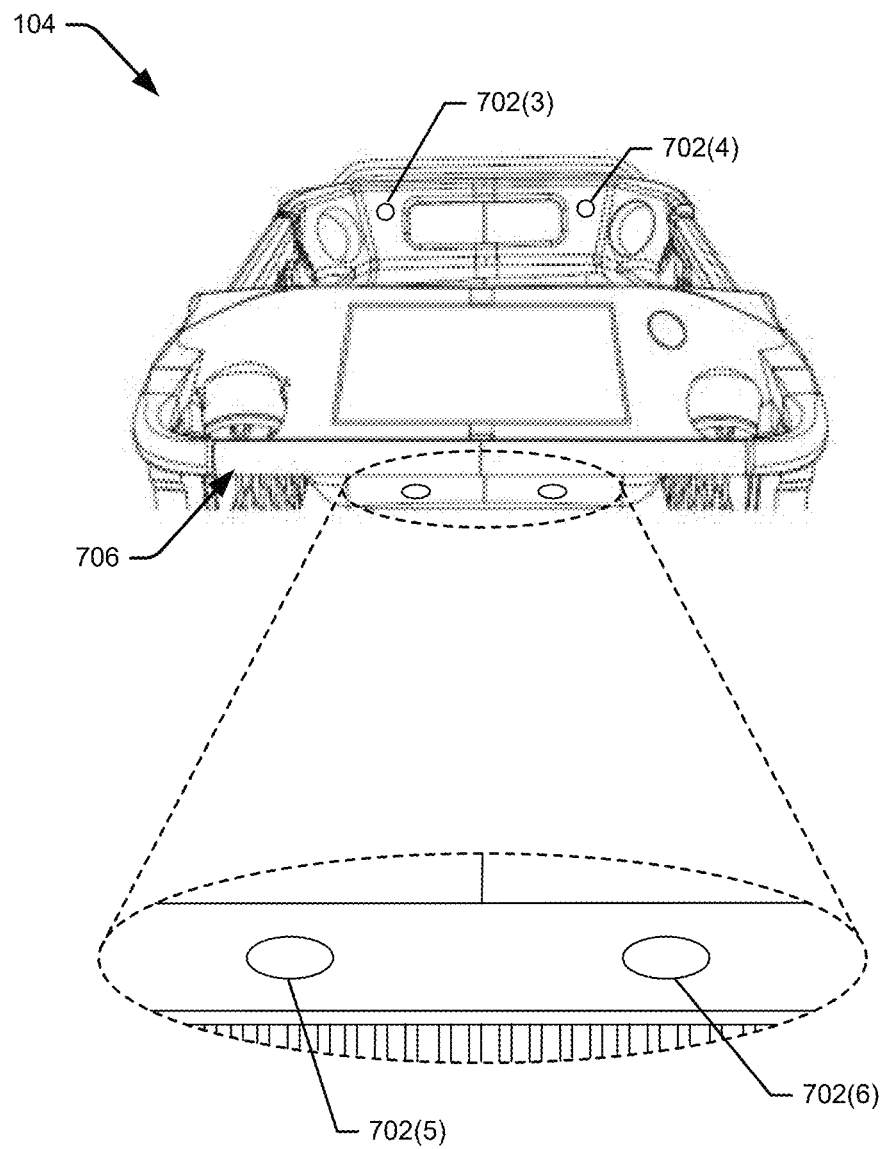
FIG. 7B illustrates an example mobile cart that includes additional cameras directed towards the basket, as well as cameras directed toward a handle of the cart for generating image data that may be used to determine when a user is placing an item into or removing an item from a storage location of the cart located under the handle area, as well as to identify the item and a quantity of the item.

FIG. 7B, meanwhile, illustrates that the example mobile cart 104 may additionally or alternatively include cameras 702(3) and 702(4) also having field-of-views (FOVs) directed towards the basket of the cart. Collectively, the cameras 702(1)-(4) may generate image data that may be analyzed by components of the cart (or servers 106) to identify activity within the region of interest 202(2). In addition, the cart 104 may include camera 702(5) and 702(6) directed towards and in some instances downwards from a handle 706 of the cart 104. Collectively, the cameras 702(5)-(6) may generate image data that may be analyzed by components of the cart (or servers 106) to identify activity within the region of interest 202(1).

FIG. 8 illustrates an example environment 800 of a materials handling facility 802 that includes an item-identifying cart 804 to identify items 806 placed in, and removed from, a basket of the cart 804 by an example user 808. In some instances, the cart 804 corresponds to the cart 804 described above, or otherwise includes functionality for determining when a user is not proximate the cart (e.g., not within a threshold distance of the cart) and, in response, powers off or down one or more components of the cart. The cart may generate first image data for identifying a user and generate second image data depicting the item 806. In addition, the cart may analyze the second image data to identify an item identifier for the item 806, determine the event 810 involving the item (e.g., add to cart, remove from cart, multiple items, quantity of items, etc.) and update a virtual shopping cart associated with the identified user 808 using the item identifier.

As FIG. 1 depicts, the user 808 may have engaged in a shopping session in the materials handling facility 802. For instance, the user 808 may have selected an item 806 from an inventory location 812 (e.g., shelf, aisle, etc.) and placed the item 806 in the cart 804 (e.g., shopping cart). The inventory location 812 may house one or more different types of items 806 and the user 808 may pick (i.e., take, retrieve, etc.) one of these items 806.

As illustrated, the materials handling facility 802 (or "facility") may have one or more entry locations 814, such as lanes. The entry location 814 may be defined by a gate in some examples and may include a movable barrier to control movement of users 808. For example, the gate may include computer-controlled panels that may be closed to impede passage of the users 808 or opened to permit passage of the user 808. Upon entering a facility 802, a user 808 may desire to utilize a cart 804 for their shopping session to transport items 806 around the facility 802 during their shopping session. In such examples, the user 808 may approach a cart corral 816, or other locations, at which carts 804 are stored. In some examples, the cart corral 816 may comprise a structure, such as an aisle, for storing nested carts 818.

Generally, two or more of the carts 804 may be configured to nest or otherwise functionality join with one another, so that the carts 804 may be easily stored in a cart corral 816, and/or transported in bulk. In some examples, the cart corral 816 may provide additional functionality beyond storage. For instance, the cart corral 816 may facilitate charging of the nested carts 818 that are in the cart corral 816. For instance, the cart corral 816 may have various electrical contacts extending along the length of a horizontal and/or vertical member of the corral 816 that, when placed in electrical contact with an electrical contact of the nested carts 818, charge one or more batteries of the nested carts 818. In other examples, power cords may extend from the cart corral 816 that may be plugged into the nested carts 818 to recharge batteries of the nested carts 818 while not in use.

In some instances, as described above, each of the nested carts 818 may reside in a low-power (e.g., deep-sleep) state when in the cart corral. For instance, the proximity sensors may detect an object (e.g., another cart) very near and, in response, may cause the respective cart to enter the low-power state. In addition, or in the alternative, each cart may include a mechanical switch that may be actuated when placed into the cart corral 816, resulting in the cart entering the low-power state. In still other instances, when the cart corral 816 includes the electrical contacts to contact with corresponding contacts of the nested carts 818, each cart may use this signal to cause the cart to enter the low-power state. Of course, while a few examples are provided, the carts may enter the low-power state in any number of ways when nested with other carts in the corral 816.

To utilize a cart 804, a user 808 may approach an unused cart that is not currently engaged in a shopping session (e.g., a nested cart 818), and interact with the unused cart 804 to identify themselves to the cart 804 and begin a shopping session. For instance, the carts 804 may include a first imaging device 834(1) (e.g., an image sensor such as a camera, photodetector, or other sensing apparatus designed to read a one or two-dimensional barcode) such that when a user 808 presents a user device, or portion thereof, such as the display, to the imaging device 834(1), the cart 804 may identify the user and corresponding user account for a shopping session. Other types of interaction may be performed by a user 808 to identify themselves to a cart 804 (e.g., uttering a name or other keyword to identify the user 808, presenting the user's face for facial recognition, typing in a password or other user information into a display of the cart 804, and/or any other type of user identification technique).

Further, in some instances the cart 804 may transition from a low-power state to a higher-power state in response to the user approaching the cart 804 and/or removing the cart 804 from the corral 816. For instance, the imaging devices 834 and/or the proximity sensors may identify the user approaching (e.g., entering within the threshold distance of the cart 804) and, in response, may cause the cart to enter the higher-power state by, for example, powering on and/or up one or more components that were previously powered off and/or down. In another example, removing the cart 804 from the corral 816 may cause the mechanical switch to trip or may cause the electrical contacts of the corral 816 to become uncoupled from the contacts of the cart 804, resulting in the cart entering the higher-power state. Again, while a few examples are provided, it is to be appreciated that the cart may transition from a low-power state to a higher-power state in response to being removed from the corral 816 and/or in response to a user approaching the cart 804 in any number of other ways.

Once a user has identified themselves to the cart 804, the item-identifying functionality of the cart 804 may be activated such that subsequent items 806 placed in the cart 804 will be identified by the cart 804 and added to a virtual shopping cart for the user 808. As illustrated, a user 808 may move the cart 804 around the facility 802 to one or more inventory locations 812. The user 808 may retrieve items from the inventory location 812 and place the items 806 in the cart 804. Additionally, the user may retrieve items 806 from the cart 804 and put the items 806 back in an inventory location 812, such as when the user 808 changes their mind regarding their desire to purchase or otherwise acquire the item 806. The cart 804 may include various components for identifying item identifiers corresponding to the items 806 placed in the cart and maintaining a virtual shopping cart for the shopping session of the user 808.

Once the user 808 has finished their shopping session, the user 808 may end the shopping session in various ways. For instance, the user 808 may return the cart 804 to the cart corral 816, provide input to the cart 804 indicating an end of the shopping session (e.g., utterance, utilize a user interface element on a touch display, etc.), or simply remove item bags or other item carriers from the cart 804 and leave the facility 802. After the user 808 has ended their shopping session, the list of item identifiers in the virtual shopping cart may be uploaded to one or more remote servers 820, over one or more networks 822, that manage user accounts for users 808 of the facility 802. The server(s) 820 may charge the appropriate user account for the listing of the items in the virtual shopping cart that the user took from the facility 802. For instance, the server(s) 820 may be configured to determine or generate information indicative of a cost of the items 806 picked by the user 808. Additionally, the server(s) 820 may store payment information (e.g., credit card information, bank account information, etc.) for each user account. In this way, when the user 808 finished their shopping session and the cart 804 sends the listing of item identifiers in the virtual shopping cart over the network(s) 822 to the server(s) 820, the server(s) 820 may be configured to determine a cost or price for all of the listed item identifiers, and charge the user via their payment information for the items 806 selected during their shopping session. In this way, the user 808 need not go through steps of a traditional check-out experience (e.g., waiting in line for a cashier, scanning items with the cashier, paying for items at the cashier, etc.).

The network(s) 822 may include private networks such as an institutional or personal intranet, public networks such as the Internet, or a combination thereof. The network(s) 822 may utilize wired technologies (e.g., wires, fiber optic cable, and so forth), wireless technologies (e.g., radio frequency, infrared, acoustic, optical, and so forth), or other connection technologies. The network(s) 822 is representative of any type of communication network, including one or more of data networks or voice networks. The network(s) 822 may be implemented using wired infrastructure (e.g., copper cable, fiber optic cable, and so forth), a wireless infrastructure (e.g., cellular, microwave, satellite, etc.), or other connection technologies.

The cart 804 may include communication interface(s) such as devices configured to couple to personal area networks (PANs), wired and wireless local area networks (LANs), wired and wireless wide area networks (WANs), and so forth. For example, the communication interfaces may include devices compatible with Ethernet, Wi-Fi™, and so forth. In some examples, the communication interface(s) may encode the data prior to sending over the network(s) 822 according to the type of protocol or standard being used. As noted above, in some examples, the servers 820 may perform some or all of the operations described below as being performed by the cart 804. While the servers 820 are illustrated as being in a location outside of the facility 802, in other implementations, at least a portion of the servers 822 may be located at the facility 802.

As illustrated, the cart 804 may generally include or be formed of a frame 824, a basket 826, a first handle 828(1) for pushing the cart 804, a second handle 828(2) for pulling the cart, a wheel frame 830, and one or more wheel castors 832 to enable movement of the cart 804 on a surface. The frame 824, the basket 826, the handles 828, and the wheel frame 830 may be formed from any suitable materials such as plastics, wood, metals, composites or any other combinations of materials. Moreover, frame 824, the basket 826, the handle 828, and the wheel frame 830 may take any form.

The basket 826 may generally be part of the frame 824 and/or supported by the frame 824 (e.g., be welded, fused, adhered, bolted, screwed, molded, or otherwise joined to the frame 824). In some examples, the basket 826 may comprise a grid or lattice-like structure (e.g., a honeycombed arrangement or framework) having one or more bars or members that are welded, fused, adhered, bolted, screwed, molded, stitched or otherwise joined in a substantially perpendicular alignment with respect to one another. The basket 826 may generally be any shape that defines an interior cavity, or receptacle, for receiving items 806 that are placed in the cart 804. The basket 826 may comprise a bottom, multiple sides protruding from the bottom, and a top. As illustrated, the bottom basket 826 may be in the shape of a quadrilateral such that there are four sides protruding from the bottom of the basket 826. Similarly, the top of the basket 826 may be defined according to the quadrilateral shape and have a perimeter with four corners. The perimeter of the top of the basket 826 may define an opening to the interior cavity (or receptacle) of the basket 826 to receive items placed inside the basket 826. In various examples, the perimeter of the top of the basket may be disposed in a substantially horizontal plane (e.g., a plane substantially along the x-axis as illustrated), and the frame 824 may include at least one vertical member that extends downward from the basket 826 to the wheel frame 830 along a substantially vertical plane (e.g., a plane substantially along the y-axis as illustrated).

The wheel frame 830 may support one or more wheel castors 832 to enable movement of the cart 804 along a surface. The wheel castors 832 include one or more wheels, axles, forks, joints or other components which enable the cart 804 to travel on various surfaces. For example, in some implementations each of the wheel castors 832 may include a single wheel provided on an axle within a fork, or two or more wheels provided on such an axle. In some other implementations, the wheel castors 832 may include two or more axles. Alternatively, in still other implementations, a single caster may be provided in lieu of the multiple wheel castors 832 shown in FIG. 8. In accordance with the present disclosure, the wheel castors 832 may operate in any manner, such as being configured to pivot or swivel, and thus automatically adjust or align with a direction of travel. In some examples, the cart 804 may be equipped with other apparatuses for enabling the cart 804 to travel on solid surfaces, including one or more wheeled components other than castors, including but not limited to omnidirectional wheels, spherical wheels or other like apparatuses. Additionally, in some other implementations, the cart 804 may include two or more skis or other runners for traveling on smooth surfaces. In still other implementations, the cart 804 may be levitated, e.g., by magnetic levitation through the use of one or more linear induction motors. Moreover, the cart 804 may be propelled or pushed by humans or autonomous mobile robots or, alternatively, by one or more motors (e.g., electric-powered or gasoline-powered).

As illustrated, the cart 804 may include a first imaging device 834(1), for identifying a user operating the cart, as well identifying items placed in a storage location underneath the handle and underneath and adjacent the basket 826, as described above. In addition, the cart 804 may include second imaging devices 834(2), 834(3), 834(4) . . . , 834(N) that include components for use in identifying items placed in the basket 826 and removed from the basket 826. The imaging device 834(1) may, in some instances, be positioned in a manner such that an FOV of the imaging device 834(1) is away from the basket 826 and substantially towards the first handle 828(1) where a user may typically operate the cart 804. The imaging devices 834(2)-(N) may be positioned at any location on the cart 804 (e.g., in the basket 826, on the basket 826, mounted to the frame 824, mounted to the basket 826, and/or any other location), oriented to have respective FOVs for identifying events that occur within and proximate to the basket 826. In some examples, the cart 804 may include at least four of the second imaging devices 834(1), 834(2), 834(3), and 834(N) that are disposed or coupled proximate to four corners of the top of the basket 826. In some examples, one or all of the components of the second imaging devices may be disposed internal to the form factor of the basket 826 and/or frame 824, at least partially internal to the form factor of the basket 826 and/or frame 824, and/or entirely external to the form factor of the basket 826 and/or frame 824 (e.g., mounted to the cart 804). However, in the illustrated example, the second imaging devices may be disposed at locations proximate to the four corners of the top or perimeter of the basket 826/frame 824. In some instances, the less that the second imaging devices protrude from the form factor of the cart 804, the more efficiently the carts 804 may be nested with respect to each other.

As described in further detail below with respect to FIG. 9, the cart 804 may further include one or more one light sources (e.g., LED) for emitting light at or prior to the time of the second imaging devices generating the second image data. The cart 804 may further include, in some instances, one or more proximity sensors (e.g., ToF sensor, PIR sensor, etc.). In some examples the proximity sensors may be activated to detect the proximity of users, objects above the top of the basket 826, and/or other objects. The proximity sensors may be configured to generate sensor data that indicates distances between objects above the top of the basket 826 of the cart 804 and the second imaging devices. The cart 804 may include components configured to analyze the sensor data and determine that an item 806 is within some threshold distance from the top of the basket 826 and/or within the basket 826. Upon detecting an object within the threshold proximity of the basket 826 using the proximity sensor, one or more components of the cart 804 may cause the light sources (LEDs) to emit light and the second imaging devices to generate image data. In some examples, the FOVs of the second imaging devices 834(2)-(N) may each at least partially overlap at a location above the top of the basket 826 corresponding to a centroid of the quadrilateral defining the top of the basket 826. The light sources may illuminate the basket 826 and/or the area above the top of the basket 826 to illuminate items 806 being placed in the cart 804, or removed from the cart 804, to act as a "flash" for the cameras that are generating image data. The second imaging devices may generate image data for a predefined period of time and/or until the proximity sensors (or the image data itself) indicates that there is no longer an object within the threshold distance from the cart 804 or top of the cart 804.

After generating the image data, one or more components of the cart 804 may process the image data to determine an item identifier for the item(s) 806 represented in the image data, and an event 810 for the image data (e.g., addition of an item 806 to the cart, removal of an item 806 from the cart). As described in more detail below with respect to FIG. 14, the cart 804 may include component(s) to determine an item 806 identifier for the item 806 (e.g., name of the item 806, SKU number for the item 806, etc.), and determine if the item 806 is being taken from the cart 804, or added to the cart 804, based on the motion of the item 806 and the result of the movement around the cart 804 once movement is no longer detected and represented by the image data. The components of the cart 804 may then update a virtual shopping cart associated with the cart 804 that indicates a virtual listing of items 806 taken by the user 808 from the facility based on the determined event 810. In some examples, the image data may be transmitted to the server(s) 820 over the network(s) 822 where the processing may be performed.

In various examples, the cart 804 may include a display 836 to present various information in user interface(s) for the user 808 to consume. In some examples, the display 836 may comprise a touch screen to receive input from the user 808 (e.g., a selection of an item identifier to disambiguate amongst potential item identifiers). In some instances, the display 836 may present customized information to the user 808 upon identifying the user 808, such as a shopping list of the user or the like.

The cart 804 may further include a battery pack module 838 that houses one or more batteries to power the components of the cart 804. The battery pack module 838 may include rechargeable batteries. In some examples, the battery pack module 838 may be detachably coupled to the wheel frame 830 and/or the frame 824 of the cart 804 such that the battery pack module 838 may be removed and taken to a charging station. In various examples, the battery pack module 838 may include rechargeable batteries that may be charged when the cart 804 is placed in a cart corral 816 (e.g., through electrical contacts, power cords, etc.). In various examples, the frame 824 and/or basket 826 may have one or more channels (e.g., grooves, holes, paths, tunnels, etc.) through which power cables/cords may pass. In this way, power cables may be run at least partially through the channels in the frame 824 and/or basket 826 inconspicuously to provide power to the various components of the cart 804.

In some instances, the cart 804 may further include one or more lighting elements 840 disposed on the frame 824 and/or basket 826 of the cart 804. The user 808 may, in some instances, operate a controller to turn on (and off) the lighting element(s) 840 to cause the lighting element(s) to emit light. Further, in some instances the controller may enable the lighting element(s) 840 to transition between multiple light states, such as different colors, flashing effects, and/or the like. The controller operable by the user 808 may comprise functionality accessible to the user 808 via the display (e.g., one or more soft buttons for turning on and/or off the light), a physical toggle switch on the frame 824 of the cart 804, and/or the light. Further, the lighting element(s) 840 may be used to signal a predefined state of the cart 804 and/or the user 808. For example, the user 808 may turn on the lighting element(s) 840 to indicate that he or she requests assistance from an associate of the facility 802, or for any other reason. In some instances, in response to the user 808 operating a controller to request assistance, the cart 804 may perform one or more actions in addition to turning on the lighting element(s) 840. For example, the display may present content responding to this request, such as an offer to connect the user 808 with an associate of the store (e.g., in person, via I/O devices of the cart, etc.). For example, in response to requesting assistance, the cart 804 may facilitate an audio-only or an audio/video call between the user 808 and an associate of the facility using one or more I/O devices on the cart, such as the display, one or more speakers, one or more microphones, one or more cameras pointed toward the user 808 and/or the like.

In still other instances, associates of the facility may, remotely or otherwise, operate the lighting element(s) 840 to change states (e.g., turn on or off) and/or the cart 804 may include components to automatically change a state of the lighting element(s) 840. For example, upon the card identifying that an item of a predefined class of items has entered the basket, the cart 804 may cause the lighting element(s) 840 to change state (e.g., from an off state to an on state) to indicate that an additional checkout workflow may now be required. For example, if the user 808 places an item into the basket 826 that requires the purchasing user to be of a certain age (e.g., alcohol) or to have a certain prescription (e.g., medicine), the cart 804 may illuminate the lighting element(s). In some instances, the cart 804 may include a lighting element on a right side of the frame, a lighting element on a left side of the frame, and/or one or more other lighting elements in other locations on the cart 804.

Figure 9:
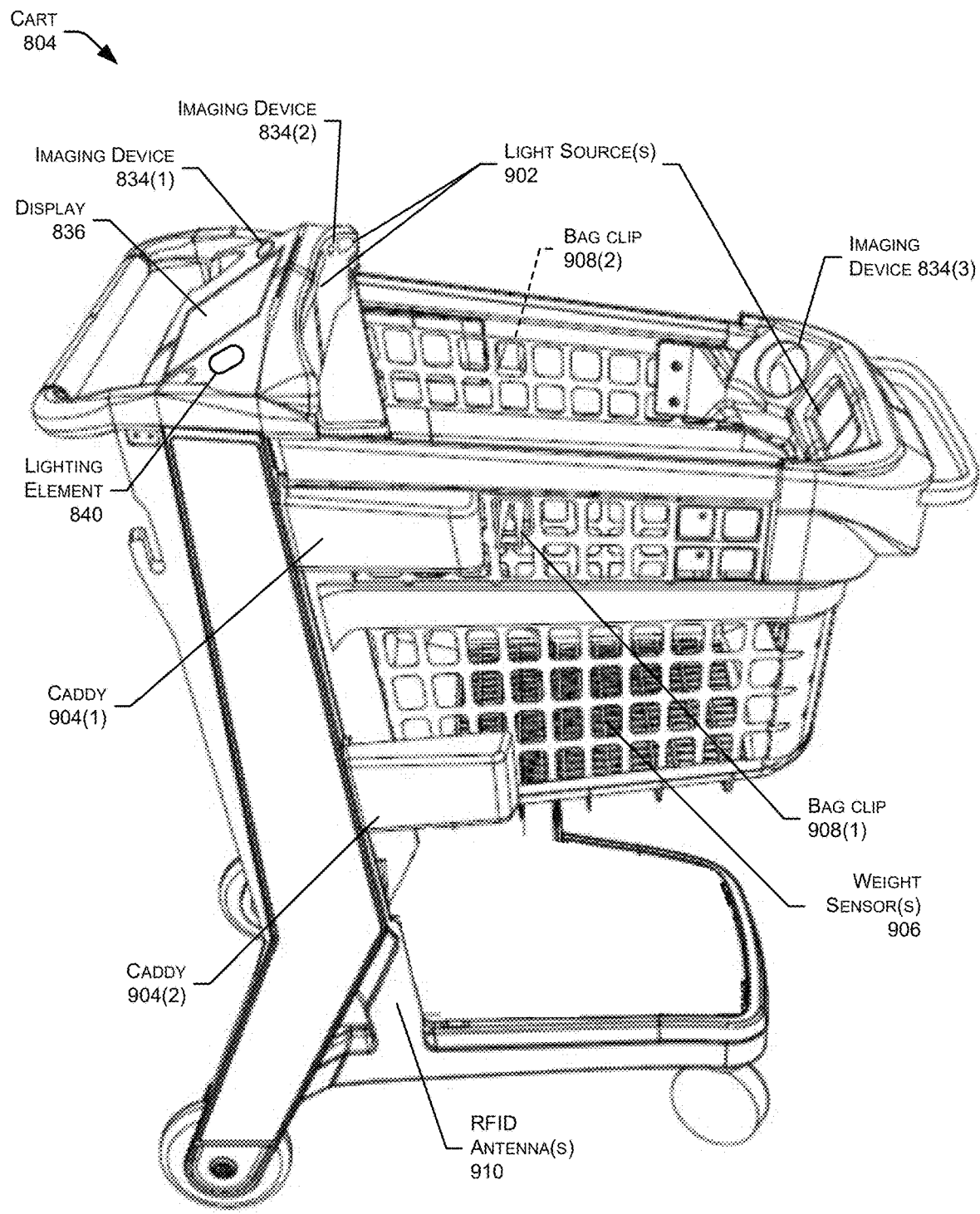
FIG. 9 illustrates the example cart of FIG. 8 in further detail.

FIG. 9 illustrates the cart 804 of FIG. 8 in further detail. As illustrated, the cart may include the first imaging device 834(1) for identifying a user, the one or more second imaging devices 834(2)-(N) for identifying items placed into or removed from the basket 826, the display 836 for presenting information to a user operating the cart 804, and the one or more lighting elements 840. In addition, the cart 804 may include one or more light sources 902 that function to emit light prior to and/or while the second imaging sensors 834(2)-(N) generate the second image data for identifying items placed into and removed from the basket 826. In some instances, these light sources 902 emit constant light, while in other instances the light sources 802 emit light in a strobing manner. In either of these instances, the light may be visible and/or non-visible light.

In addition, the cart may include one or more caddies, such as a caddy 904(1) and a caddy 904(2), coupled to the left and/or right side of the frame or basket of the cart 804. For example, the cart 804 may include the first and second caddies 904(1) and 904(2) on the right side of the cart, and two similarly situated caddies on the left side of the cart (not shown). Each caddy may define a receptacle (e.g., having an opening at the top) for housing one or more items therein. In some instances, the caddies may be beyond the FOV of the second imaging devices 834(2)-(N) such that the user is able to place personal items (e.g., keys, wallet, phone, etc.) into the receptacle defined by the respective caddy without the imaging devices 834(2)-(N) generating image data corresponding to this addition. In other instances, the caddies may be within the FOV of one or more of the imaging devices.

In addition, the cart 804 may include one or more respective weight sensors 906 for determining a current weight of the basket 826 and, thus, items in the basket 826. For example, one or more weight sensors 906 comprising strain gauges or the like may reside underneath the basket 826. In some instance the bottom platform of the cart may also include one or more weight sensors for determining the weight of items on the bottom platform. Further, in some in some instances each caddy may comprise a respective weight sensor 906 comprising a strain gauge or other sensor that continuously or periodically may be used to determine a weight of the basket and/or whether a change in weight has occurred. For instance, the cart 804 may include two weight sensors 906 on each side of the basket 826. Each pair of weight sensors 906 may, in some instances, reside along the same vertical axis. That is, a top weight sensor on the right side of the basket 826 may reside above a bottom weight sensor on the right side.

Regardless of the location of the weight sensors 906, the weight data may be used to identify when items have been placed into or removed from the basket and, in some instances, may be used to identify items placed into or removed from the basket. For example, the weight data may be used to determine the identity of an item placed into or removed from the basket (e.g., to identify that a bottle of ketchup was placed into the basket), identify a number of instances of an item (e.g., a number of bottles of ketchup placed into the basket), to measure an amount of something (e.g. 1 pound of peanuts), and/or the like.

FIG. 9 further illustrates that the cart 804 may include one or more bag clips, such as a bag clip 908(1) on a right side of the basket 826 and a bag clip 908(2) on a left side of the basket 826. As illustrated, the bag clips 808 may reside on an outside, top portion of the basket such that a user may place a bag into the interior of the basket while securing a first strap of the bag to the first clip 908(1) and a second strap of the bag to the second clip 908(2). Thereafter, the user may place items into and/or remove items from the bag. At the end of the shopping session, the user may remove the bag containing the items from the basket (e.g., by removing the straps from the clips) and exit the facility.

FIG. 9 further illustrates that the cart 804 may include one or more RFID antenna(s) 910, which may be used for determining a location of the cart 804 within the facility 802. In some instances, the inventory locations 812 may include respective RFID tags that may be read by the RFID antennas 910 of the cart. In some instances, the cart 804, or a remote system communicatively coupled to the cart 804, may store map data that indicates associations between respective location with the facility to respective RFID tags throughout the facility. As illustrated, in some instances the RFID antennas 910 may reside near a bottom portion of the frame of the cart. For instance, the cart 804 may include an RFID antenna near a bottom portion of the right side of the frame and an RFID antenna near a bottom of the left side of the frame. In other instances, however, the RFID antennas 910 may reside at other locations on the cart 804 and/or distributed at multiple locations on the cart 804.

Figure 10B:
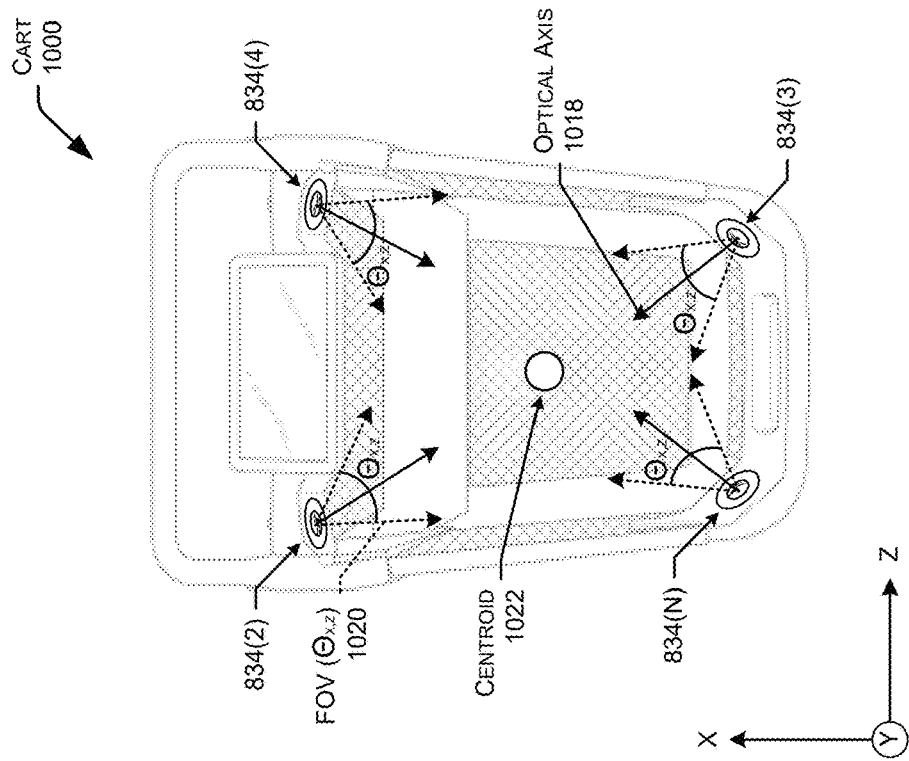
FIGS. 10A-D illustrate example views of an item-identifying cart that has one or more cameras for identifying items placed in the cart. In addition.
Figure 10A:
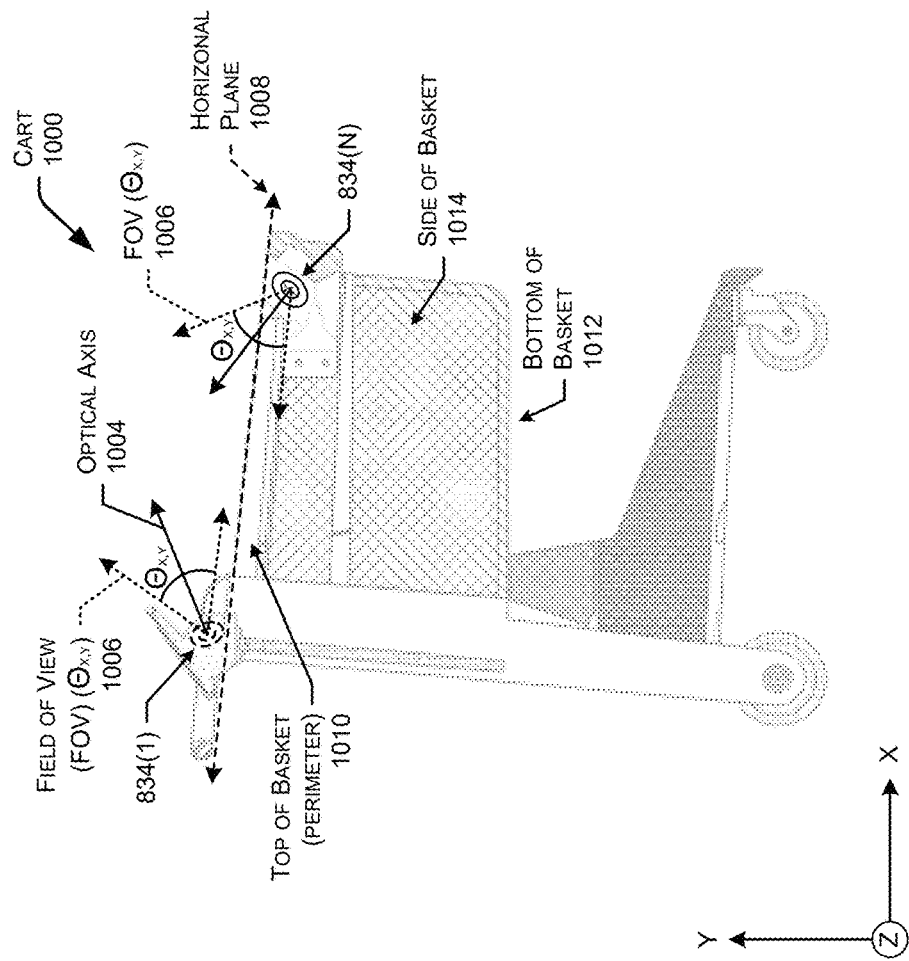

FIG. 10A illustrates an example cross-sectional view of an item-identifying cart 1000 that includes imaging device 834 for identifying items 806 placed in the cart 1000. Again, the cart 1000 may include the proximity sensors and corresponding functionality as described above with reference to the cart 804. While this cart 1000 may have a different form factors than other carts illustrated and described herein, characteristics of the cart 1000 may be applied to the other cart form factors, and vice versa. As illustrated, the cross-section of the cart 1000 is taken along a plane defined by the x-axis and y-axis along the center of the cart 1000 from the back to the front of the cart 1000.

In some examples, the imaging device 834(2) is positioned at a first corner of the basket 826 near the back of the cart 1000. The imaging device 834(2) may have an optical axis 1004 and an FOV 1006 oriented along the x-y plane. The optical axis 1004 of the first capture assembly 834(1) may be directed upward from a substantially horizontal plane 1008 and towards the interior of the perimeter 1010 of the basket 826. In some examples, the basket 826 may include a bottom of the basket 1012, ones or more sides of the basket 1014 protruding up from the bottom 1012, and a top of the basket (perimeter) 1010 that is disposed along the substantially horizontal plane 1008. In some examples, the FOV 1006 of each of the second imaging devices may have a lower edge that is defined according to the horizontal plane 1008.

The first imaging device 834(2) may have an optical axis 1004 directed upward from the substantially horizontal plane 1008 and towards the interior of the perimeter 1010 of the basket 826. In some examples, the FOV ($\theta_{x,y}$) 1006 may be defined according to the optical axis 1004 (e.g., the optical axis 1004 may be approximately the middle of the FOV 1006). The FOV 1006 may be any FOV for of the second imaging devices (e.g., 80 degrees, 80 degrees, 45 degrees, etc.). Generally, the FOV 1006 may at least partially include an area above the top of the basket 210. Similarly, another imaging device 834(4) coupled proximate to a corner of the basket 826 on the front of the cart 1000. The imaging device 834(4) may have an optical axis 1004 directed upward from the substantially horizontal plane 1008 and towards the interior of the perimeter 1010 of the basket 826. In some examples, the FOVs 1006 may include an area above the top 1010 of the cart 1000, an area within the basket 826 of the cart, and/or a combination of above and below the top 1010 of the basket 826.

FIG. 10B illustrates an example top view of an item-identifying cart 1000 that has imaging devices 834(2)-(N) for identifying items 806 placed in the cart 1000. As illustrated, the cart 1000 is shown from a top such that the dimensions of the cart 1000 are illustrated along an x-axis and a z-axis (x-z coordinate plane).

In some examples, four imaging devices 834 are positioned at four different corners of the frame 824 and/or basket 826 of the cart 1000. Each of the four imaging devices 834 may include respective optical axes 1018 directed inward relative to the perimeter 1010 of the basket 826. Additionally, the four imaging devices 834(2)-(N) may each have FOVs ($\theta_{x,z}$) 1020 that are defined according to the optical axes 1018 (e.g., the optical axes 1018 may be approximately the middle of the FOVs 1020). The FOVs 1020 may be any FOV for cameras in the imaging devices (e.g., 80 degrees, 80 degrees, 45 degrees, etc.). Generally, the FOVs 1020 for each of imaging devices 834 may overlap at least partially at a centroid 1022 of the frame 824 and/or basket 826 of the cart 1000. The FOVs 1020 may, in combination, cover all, or most, of the interior of the perimeter 1010 of the basket 826 such that items 806 are detected and identified using at least one of the capture assemblies 834.

Figure 10D:
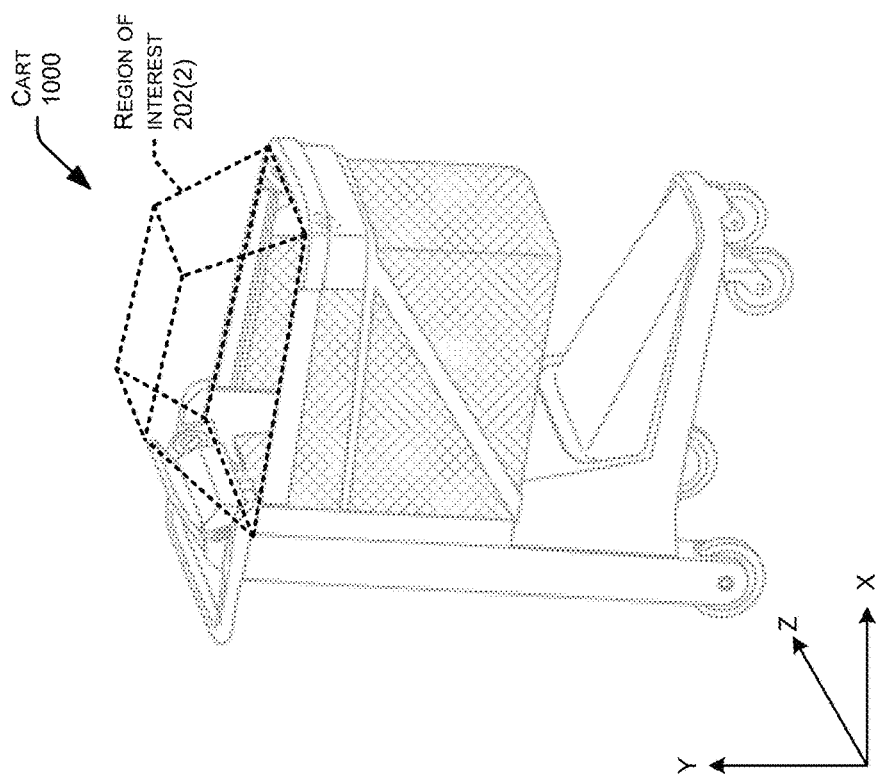
Figure 10C:
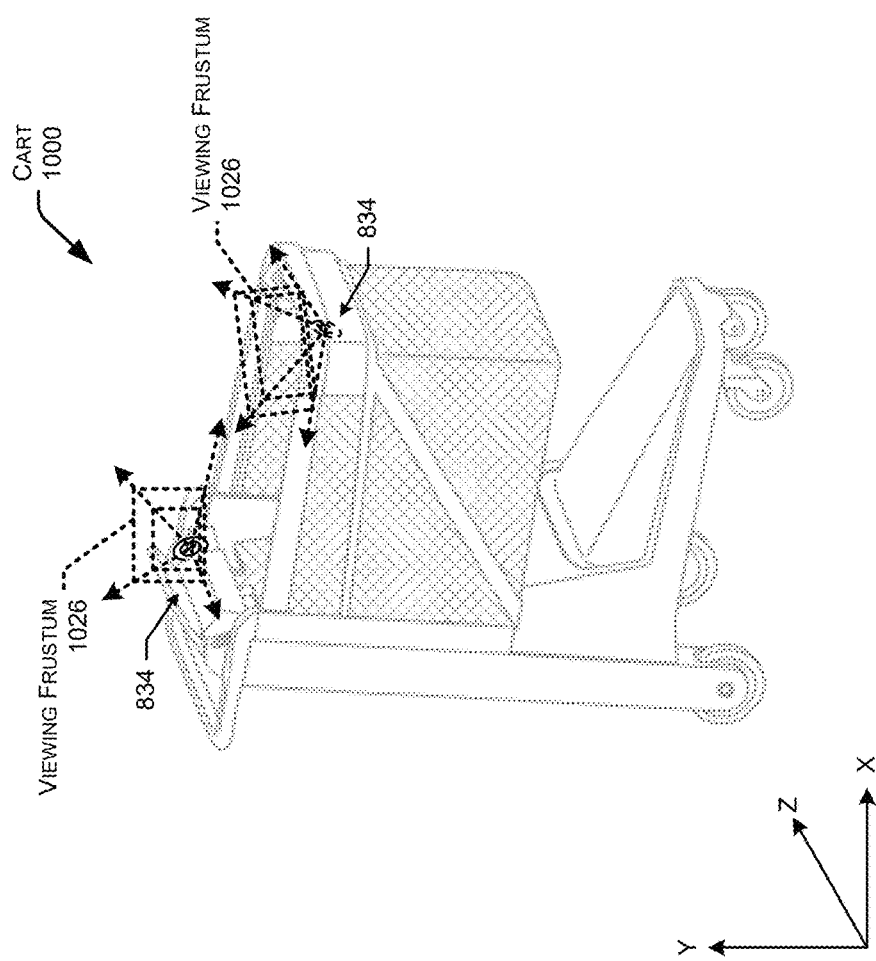

FIG. 10C illustrates an example perspective view of an item-identifying cart 1000 that has imaging devices 834 for identifying items 806 placed into the cart 1000. As illustrated, the cart 1000 may include multiple imaging devices that have viewing frustums 1026 that may be oriented in the same direction as the optical axis 1004. The viewing frustums 1026 may generally be the region of space in the environment of the cart 1000 that is within the field of view of the camera and/or proximity sensor of the imaging devices 834. The viewing frustums 1026 for each of the imaging devices 834 may be oriented inward to the basket 826 of the cart, and upward relative to the top, or perimeter, of the basket. The proximity sensor, if present, and imaging devices may have the same viewing frustum 1026, or different viewing frustum's 1026 that at least partially overlap.

FIG. 10D illustrates another example perspective view of an item-identifying cart 1000 that has imaging devices 834 for identifying items 806 placed into the cart 1000. As shown in FIG. 6D, the viewing frustums 1026 and/or FOV's 1006 for each of the imaging devices 834 may generally define the region of interest 202(2). The region of interest 202(2) may comprise a volumetric, three-dimensional (3D) shape in which items 806 are captured in image data of the cameras, and/or detected by proximity sensors. Thus, the region of interest 202(2) defines a volumetric region in which at least one of the cameras in a capture assembly is able to capture image data representing an item 806. Generally, the region of interest 202(2) may encompass substantially all, or a large majority of, the perimeter of the top of the basket. In this way, items 806 placed in the basket 826 will be detected and have image data generated that represents the items 806 as they are being placed in the basket 826. Although illustrated as including space above the basket 826, in some examples, the region of interest 202(2) may additionally, or alternatively, include space inside the basket 826 (e.g., downward facing cameras). In some instances, the region of interest 202(2) defined by the cameras on the cart 1000 may be the same as the region of interest 202(2) of the proximity sensors, or different than the region of interest 202(2) of the proximity sensors.

FIG. 11A illustrates an example cross-sectional view of an item-identifying cart 1000 that includes the imaging device 702(6) for identifying items 806 placed in the cart 1000. Again, the cart 1000 may include the proximity sensors and corresponding functionality as described above with reference to the cart 804. While this cart 1000 may have a different form factors than other carts illustrated and described herein, characteristics of the cart 1000 may be applied to the other cart form factors, and vice versa. As illustrated, the cross-section of the cart 1000 is taken along a plane defined by the x-axis and y-axis along the center of the cart 1000 from the back to the front of the cart 1000. In some examples, the imaging device 702(6) is positioned with an optical axis 1004 and an FOV 1006 oriented downwards from the handle and towards a storage location underneath the handle and adjacent the basket of the cart 1000.

FIG. 11B illustrates another example perspective view of an item-identifying cart 1000 and shows the region of interest 202(1) defined by the imaging devices 702(5) and 702(6). The region of interest 202(1) may comprise a volumetric, three-dimensional (3D) shape in which items 806 are captured in image data of the cameras, and/or detected by proximity sensors. Thus, the region of interest 202(1) defines a volumetric region in which at least one of the cameras in a capture assembly is able to capture image data representing an item 806. that has imaging devices 834 for identifying items 806 placed into a storage location of the cart 1000 residing beneath the handle.

Figure 12:
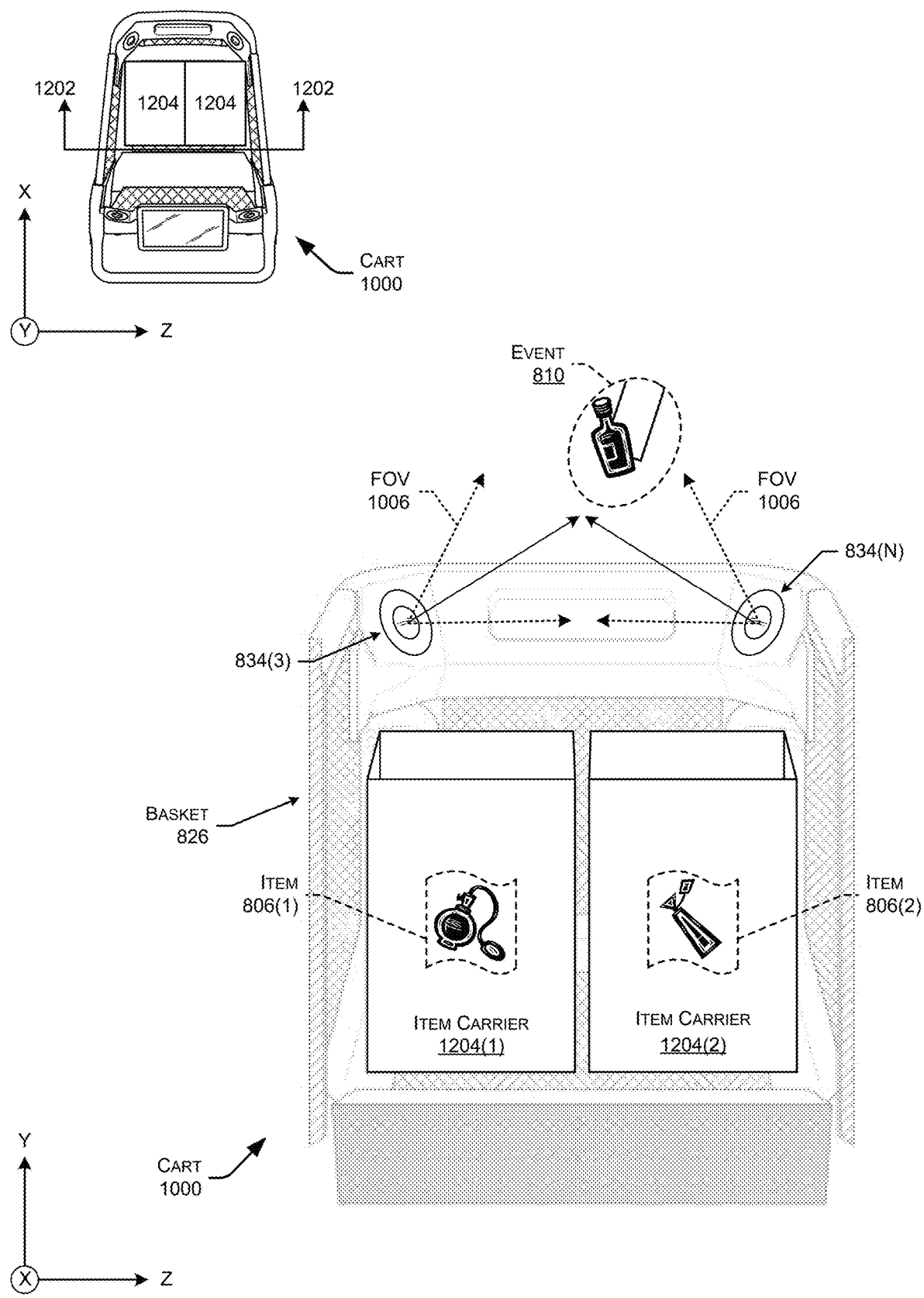
FIG. 12 illustrates another example cross-sectional view of an item-identifying cart that has item carriers placed inside the basket of the cart, and cameras that are used to identify an item being placed in the item carriers.

FIG. 12 illustrates another example of an item-identifying cart 1000, including a top view and a cross sectional view 1202, that has item carriers 1204 placed inside the basket of the cart 1000, and imaging devices 834 and light sources 902 (within respective capture assemblies) that are used to identify an item being placed in the item carriers 1204.

As illustrated by the top view, the cart 1000 may include a basket that is sized to store one or more item carriers 1204, such as bags (e.g., plastic bags, paper bags, etc.), boxes, user-provided item carrier, and/or any other item carrier. In some examples, the cart 1000 may have a basket 826 that is sized to efficiently fit (e.g., minimize empty space in the basket 826) one or more of the item carriers 1204. As shown in the cross-sectional view of the basket 826 of the cart, the item carriers 1204 may be sized such that the tops of the item carriers 1204(1) and 1204(2) are below the perimeter defining the top of the basket 826. In this way, the FOVs of the imaging devices 834 are not obstructed by the item carriers 1204.

As shown, the item carriers 1204 may have items 806 stored therein, which are no longer visible to cameras due to their placement in the item carriers 1204. Accordingly, if the imaging devices 834 had FOVs 1006 that generated image data of the interior of the basket 826, the items 806 may not be visible due to occlusion from the item carriers 1204. However, to identify the items 806 placed in a cart 1000, the imaging devices 834 need to be able to view the items 806, which would prevent users 808 from being able to place item carriers 1204 in their carts 804. Thus, by having FOVs 1006 that at least partly face upward relative to the top of the perimeter of the basket 826, the items 806 that are placed in the basket are identifiable in image data generated by the imaging devices 834. Additionally, users 808 are able to place their item carriers 1204 directly in the basket 826 to receive items 806 as the user 808 shops, thereby reducing friction in the traditional-checkout experience by having to take items out of the cart 1000 to be bagged or otherwise placed in item carriers 1204.

In some examples, the basket 826 (or other location on the cart 1000) may include one or more hooks to help support the item carriers 1204. For instance, the item carriers 1204 may be a cloth, or other material, with handles or holes. To help hold the item carriers 1204 open and/or up, the basket 826 may include hooks near the top or perimeter and/or hooks on the outside of the basket 826 to hook into holes of the item carriers 1204 and/or to hold up handles of the item carriers 1204, such as the bag clips 808(1)-(2) discussed above.

Figure 13:
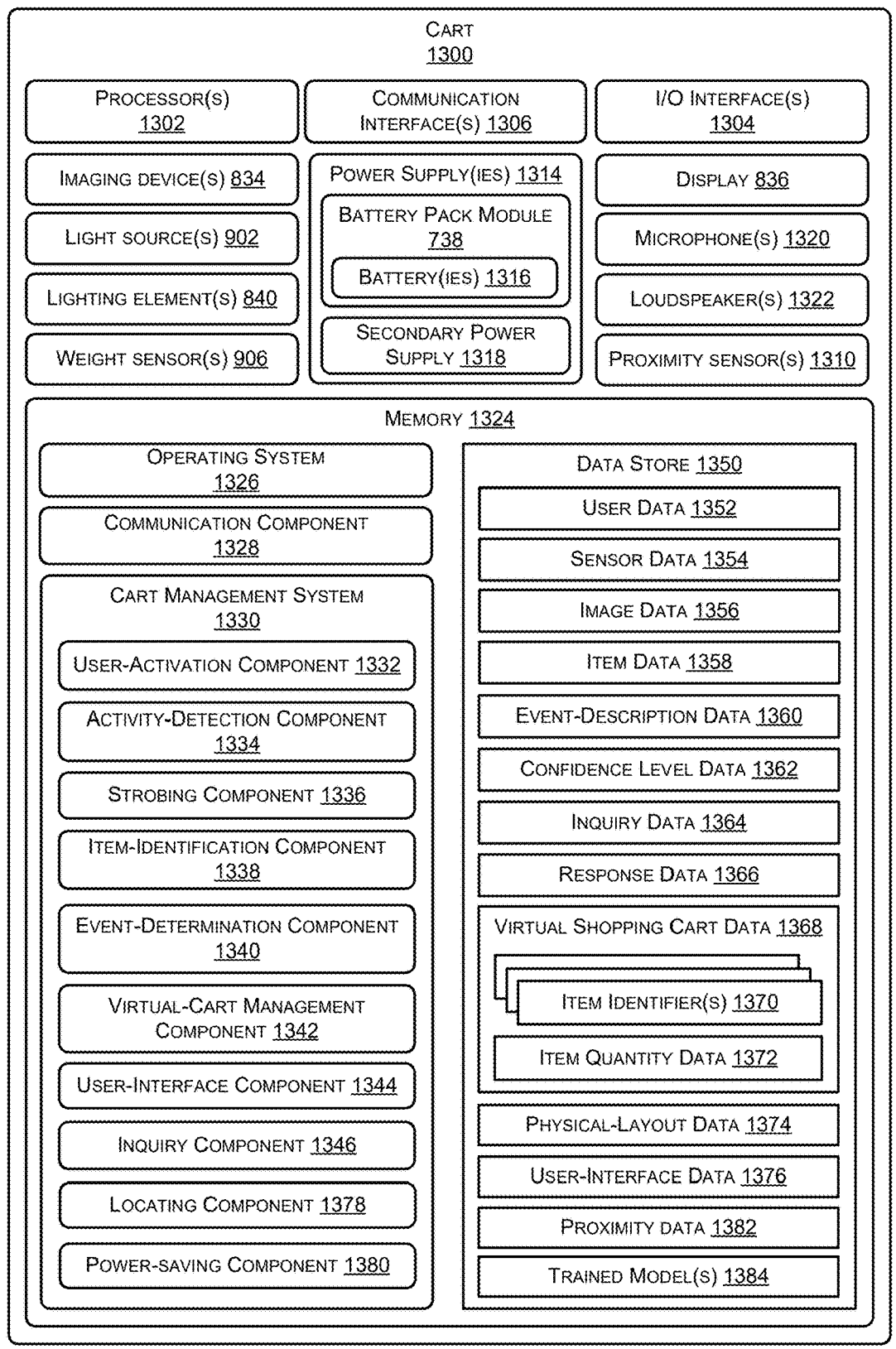
FIG. 13 illustrates example components of an item-identifying cart configured to support at least a portion of the functionality of a cart management system.

FIG. 13 illustrates example components of an item-identifying cart 1300 configured to support at least a portion of the functionality of a cart management system. In some instances, the cart 1300 may correspond to and/or include some or all of the functionality of the carts described above.

The cart 1300 may include one or more hardware processors 1302 (processors) configured to execute one or more stored instructions. The processors 1302 may comprise one or more cores. The cart 1300 may include one or more input/output (I/O) interface(s) 1304 to allow the processor 1302 or other portions of the cart 1300 to communicate with other devices. The I/O interfaces 1304 may comprise Inter-Integrated Circuit (I2C), Serial Peripheral Interface bus (SPI), Universal Serial Bus (USB) as promulgated by the USB Implementers Forum, and so forth. The I/O interfaces 1304 may allow the various modules/components to communicate with each other and/or control each other.

The cart 1300 may also include one or more communication interfaces 1306. The communication interfaces 1306 are configured to provide communications between the cart 1300 and other devices, such as the server(s) 820, sensors, interface devices, routers, and so forth. The communication interfaces 1306 may include devices configured to couple to personal area networks (PANs), wired and wireless local area networks (LANs), wired and wireless wide area networks (WANs), and so forth. For example, the communication interfaces 1306 may include devices compatible with Ethernet, Wi-Fi™, and so forth. The cart 1300 may also include one or more busses or other internal communications hardware or software that allow for the transfer of data between the various modules and components of the cart 1300.

The cart 1300 may also include the one or more imaging devices 834, such as the first imaging device 834(1) for identifying a user operating the cart and one or more second imaging devices 834(2)-(N) and/or 310 for identifying items placed into and removed from a basket of the cart. The cart 1300 may further include the light sources 902, the lighting elements 840, and the weight sensors 906 described above.

In some instances, the cart 1300 further includes include one or more proximity sensors 1310. The proximity sensors 1310 may comprise any type of sensor that is able to detect the presence of nearby objects without the need for physical contact (e.g., ToF sensors, PIR sensors, infrared sensors, capacitive sensors, ultrasonic sensors, etc.). As described above, each proximity sensor may be configured to output an indication when the respective proximity sensor detects an object within a threshold distance of the sensor. Further, the configured threshold distances may vary from sensor to sensor in order to collectively create the virtual perimeter 308, discussed above with reference to FIG. 3D. Further, in some instances a single proximity sensor may be configured with multiple threshold distances. For instance, in the example of a proximity sensor having 64 diodes, the senor may be effectively split into quadrants of sixteen sensors such that each quadrant is configured to output an indication when an object is detected at a threshold distance that is potentially unique to the other three quadrants. For instance, a distance of a closest object of each diode of the sixteen diodes in a particular quadrant may be averaged and this average distance may be compared to a threshold to determine whether to output an indication that an object has been detected.

The imaging devices, meanwhile, may comprise any type of camera or imaging device configured to generate image data (and/or video data) or information descriptive of a plurality of picture elements or pixels. Additionally, in some instances the cart 1300 may include one or more imaging devices that are outward-facing and that generate image data representing the facility 802 around the cart 1300.

The cart 1300 may include one or more power supply(ies) 1314 to provide power to the components of the cart 1300, such as the battery pack module 838. The power supply(ies) 1314 may also include a secondary (e.g., internal) power supply 1318 to allow for hot swapping of battery pack modules 838, such as one or more capacitors, internal batteries, etc.

The cart 1300 may also include a display 836 configured to display image data, such as pictures, videos, user interface elements, and/or any other image data. The display 836 may comprise any type of display 836, and may further be a touch screen to receive touch input from a user. The cart 1300 may also include one or more microphones 1320 and one or more loudspeakers 1322 to facilitate a dialogue with a user 808, and/or to receive feedback from the user 808. The microphone(s) 1320 may capture sound representing the user's speech, and the loudspeaker(s) 1322 may output machine-generated words to facilitate a dialogue, prompt a user 808 for feedback on an item 806 and/or for other information, and/or output other alerts or notifications.

The cart 1300 may include one or more memories 1324. The memory 1324 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1324 provides storage of computer-readable instructions, data structures, program modules, and other data for the operation of the cart 1300. A few example functional modules are shown stored in the memory 1324, although the same functionality may alternatively be implemented in hardware, firmware, or as a system on a chip (SOC).

The memory 1324 may include at least one operating system (OS) component 526. The OS component 1326 is configured to manage hardware resource devices such as the I/O interfaces 1304, the communication interfaces 1306, and provide various services to applications or components executing on the processors 1302. The OS component 1326 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 1324. These components may be executed as foreground applications, background tasks, daemons, and so forth. A communication component 1328 may be configured to establish communications with one or more of the sensors, one or more of the servers 820, or other devices. The communications may be authenticated, encrypted, and so forth.

The memory 1324 may further store a cart management system 1330. The cart management system 1330 is configured to provide the item-identifying functions (and other functions) provided by the cart 1300 as described herein. For example, the cart management system 1330 may be configured to identify a user operating a cart, identify items 806 placed into the cart, and maintain a virtual shopping cart for a user 808 of the cart 1300. While these components are described as operating on the cart 1300, in some instances some or all of these components reside additionally or alternatively on the servers 820 or elsewhere.

The cart management system 1330 may include a user-activation component 1332 that performs operations for activating a shopping session using a cart 1300 on behalf of a user 808. For instance, a user 808 may have previously registered for a user account with an operator of the facility to utilize various automated management services provided by an operator of the facility 802. The user 808 may have registered for a user account, such as by providing user data 1352, to automate payments made for items taken by the user and included a payment means (e.g., credit card, bank account number, etc.), and may have also provided an identification means in the user data 1352 to the user-activation component 1332 such that the cart 1300 can recognize the user 808. For instance, the user 808 may have registered to identify themselves to the cart 1300 using any identification technique by the user-activation component 1332, such as by providing user data 1352 by presenting an identification means to the first imaging device 834(1) (e.g., presenting a driver's license, presenting a facility-issued card, presenting a user identifier via a mobile phone, etc.), speaking a predefined utterance that is captured by the microphone(s) (e.g., a name of the user, a predefined keyword, etc.), and/or looking into a camera for facial recognition. Once a user 808 has identified themselves to using the user-activation component 1332, the user-activation component 1332 may open a shopping session where the cart 1300 identifies and track items 806 retrieved by the user 808 and placed in the cart 1300.

The cart management system 1330 may additionally include an activity-detection component 1334 configured to detect items 806 (or objects) within a particular proximity to the cart. For example, one or more proximity sensor(s) 1310 may generate sensor data 1354 that indicates a distance between the proximity sensor(s) 1310 and any objects located in the FOV of the proximity sensor(s). The activity-detection component 1334 may analyze the sensor data 1354 and determine if an object is within a threshold distance indicating that the object is near the cart 1300 and/or within or near the perimeter of the top of the basket 826 of the cart 1300 (e.g., one foot from the proximity sensor(s), two feet from the proximity sensor(s), etc.). In this way, the proximity sensor(s) may generate sensor data 1354 that indicates whether or not an item 806 is being moved in or out of the basket 826 of the cart 1300. However, in some examples, rather than using sensor data 1354 generated by a proximity sensor(s), the activity detection component 1334 may utilize image data 1356 generated by the imaging devices 834(2)-(N) to determine if an object is within a threshold distance from the cart 1300.

The cart management system 1330 may further include a strobing component 1336 configured to cause the light sources 902 and/or shutters of the imaging devices 834 to strobe according to different frequencies. As noted above, the light sources 902 may emit light in any light spectrum (e.g., infrared, near infrared, visible, etc.). However, some items 806 may have text and/or other marking printed thereon using dye-based color inks that have diminished and/or similar near infrared (NIR) absorbance. This may lead to compromised contrast between, and essentially "washing out" of many distinct features in the visible spectrum when viewed in NIR. Accordingly, in some examples it may be advantageous to cause the light sources 902 to emit light in the visible spectrum. When generating image data 1356 using the imaging devices 834, motion blur may appear when capturing fact moving objects. However, the motion blur may be reduced or eliminated by exposing the imaging device's imager for a short (e.g., sub-millisecond) durations. Accordingly, the strobing component 1336 may strobe the opening and closing of shutters of the imaging devices 834 to limit the sensor exposure duration.

Additionally, the strobing component 1338 may cause the LEDs to emit/strobe light at a particular frequency, as discussed further with respect to FIG. 10. In some instances, the strobing component 1338 may cause the LEDs to strobe at a first rate (e.g., 8200 hertz) prior to detecting predefined activity, such as a user placing an item into or removing an item from a cart, while causing the LEDs to strobe at a second, different rate (e.g., 60 hertz) upon identifying the predefined activity. Further, the LEDs may emit light in the visible range in some instances, and in the non-visible range in other instances. In some examples, the LEDs may comprise RGB LEDs that may be mixed according to different respective levels to tune a resulting color of the LEDs.

The cart management system 1330 may also include an item-identification component 1338 configured to analyze image data 1356 to identify an item 806 represented in the image data 1356. The image data 1356 may comprise information descriptive of a plurality of picture elements, or pixels, for one or more image frames (e.g., a still picture, multiple picture frames, video frames, etc.). The item-identification component 1338 may analyze the image data 1356 using various image processing techniques, or computer vision techniques. For instance, the item-identification component 1338 may extract a representation of an item 806 depicted in the image data 1356 generated by at least one imaging device 834. The representation may include identifying text printed on the item 806, colors or color schemes printed in the item, determining 2-D and/or 3D shapes of the items 806, and/or other techniques for extract a representation of the item 806. In some instances, the representation of the item 806 depicted in the image data 1356 may comprise a numeric representation, such as a feature vector or a set of feature vectors.

In some examples, a data store 1350 stored in the memory 1324 may include item data 1358, which may include representations of the items 806 offered for acquisition at the facility 802. The item-identification component 1338 may compare the extracted represented of the item 806 with the "gallery" or stored representations of the known items 806 in the item data 1358. In some instance, the item representation may include an indication of a barcode or SKU data for the item 806 as recognized in, or extracted from, the image data 1356. The item-identification component 1338 may determine confidence level data 1362 based on the comparisons with item representation in the item data 1358. The item-identification component 1338 may determine, and assign, confidence levels indicating how likely it is that the item 806 represented in the image data 1356 corresponds to an item from the item gallery in the item data 1358. Based on the confidence level data 1362, the item-identification component 1338 may determine an item identifier 1370 for the item in the image data 1356 (or multiple item identifiers 1370) that corresponds to an item in the item data 1358 to which the item 806 corresponds.

In some examples, the data store 1350 may include physical-layout data 1374 that is used by the item-identification component 1338 to determine the item 806. The physical-layout data 1374 may include or provide a mapping of physical locations within the physical layout of devices and objects such that the location of the cart 1300 may be utilized to determine an item 806 stored nearby. The physical-layout data 1374 may indicate the coordinates within the facility 802 of an inventory location 812, items 806 stored at that inventory location 812, and so forth. In examples where the cart 1300 has location determining sensors (e.g., GPS, RFID, proximity, etc.), the location sensor data may be used to determine where in the store the user 808 is. In such examples, the item-identification component 1338 may access the physical-layout data 1374 to determine if a location associated with the event is associated with items 806, and confidence levels for the corresponding representations of items in the item data 1358. Continuing the example above, given the location within the facility 802 of the event and image camera data, the physical-layout data 1374 may determine the items 806 that may have been represented in generated images of the event 810.

The cart management system 1330 may further include an event-determination component 1340 to determine event-description data 1360 for the item 806 in the image data 1356. The event-determination component 1340 may determine if the user 808 is adding an item 806 to the cart 1300, removing the item from the cart 1300, etc., based on movement of the item 806 and/or whether the item is shown in the image data 1356. For instance, if the item 806 is shown as being moved downward towards the interior of the cart 1300, and the user's hand then leaves the basket without the item, 106 it can be determined that the user 808 added the item 806 to the cart 1300. Similarly, if the user's hand 808 moves into the cart without an item 806 and is depicted in the image data 1356 taking an item 806 from the cart, the event-determination component 1340 may determine that the user 808 removed an item 806 from the cart 1300.

The cart management system 1330 may also include a virtual-cart management component 1342 configured to manage virtual shopping cart data 1368 for the cart 1300. For instance, the virtual-cart management component 1342 may utilize the item data 1358, event-description data 1360, and confidence level data 1362 to add item identifier(s) 1370 to the virtual shopping cart data 1368 for items 806 that were added to the cart 1300, remove item identifier(s) 1370 from the virtual shopping cart data 569 for items 806 that were removed from the cart 1300, and track item quantity data 1372 indicating quantities of particular items 806 in the cart 1300.

The cart management system 1330 may further include a user-interface component 1344 configured to present user interfaces on the display 836 based on user-interface data 1376. The user interfaces 1376 may include one or more fields to present data, and/or receive touch input (or other input via a keyboard, mouse, etc.) from a user 808. For instance, if the item-identification component 1338 is unable to determine an item identifier 1370 for an item 806 shown in the image data 1356, the user-interface component 1344 may receive inquiry data 1364 generated by an inquiry component 1346 to prompt a user 808 for feedback to help identify the item 806, and/or other information (e.g., if multiple items were placed in the cart 1300). The inquiry component 1346 may be configured to generate inquiry data 1364 based on the information needed to identify the item 806. For instance, the inquiry data 1364 may include a prompt to request particular feedback from the user 808, such as to provide input (e.g., touch input, vocal/utterance input, etc.) to identify the item 806, input to indicate how many items 806 were added to the cart, input to indicate whether an item 806 was removed or added, etc. In some examples, the user-interface component 1344 may present one or more images depicting items from the item data 1358 that have the highest confidence levels as corresponding to the item 806 in the image data 1356, but confidence levels that are not high enough to make a final decision as to the item 806. For instance, the user-interface component 1344 may present pictures of two different items that have high confidence levels 1362 and request that the user 808 select or indicate the appropriate item 806. Additionally, or alternatively, the user-interface component 1344 may present user-interface data 1376 that prompts the user for feedback regarding whether or not the item 806 was added to, or removed from the cart 1300. The received response may be stored as response data 1366.

In some examples, the cart management system 1330 may further include a locating component 1378 configured to determine locations of the cart 1300 in the facility 802. For instance, the locating component 1378 may analyze sensor data 1354 collected by sensors of the cart 1300 to determine a location. In some examples, the communication interface(s) 1306 may include network interfaces that configured the cart 1300 to receive or detect wireless signals (e.g., WiFi signals, Bluetooth signals, etc.) and generate sensor data 1354 indicative of the signals. The locating component 1378 may analyze the sensor data 1354 using various techniques to identify the location of the cart 1300, such as WiFi triangulation, received signal strength indicators (RSSI), and/or other methods for analyzing wireless signals to determine a location of the cart 1300. In some instances, the facility 802 may include various infrared (IR) or near-IR emitters at different locations that emit light according to frequencies, patterns, etc. that indicate the different locations in the facility 802. In such examples, the cart 1300 may include a light sensor to generate the sensor data 1354 representing the IR or NIR and determine the location of the cart 1300 in the facility. In some instances, there may be visible landmarks or markers throughout the facility that indicate a location in the facility, and the locating component 1378 may analyze image data 1356 generated by an outward facing camera to determine a location of the cart 1300. As another example, there may be various radio frequency (RF) emitters positioned throughout the store, and the cart 1300 may include an RF receiver to allow the locating component 1378 to perform IR beaconing to determine the location of the cart 1300. The locating component 1378 may perform one, or any combination, of the above techniques to determine a location of the cart 1300 in the facility and/or any other technique known in the art.

The locating component 1378 may perform various operations based on determining the location of the cart 1300 within the facility 802. For instance, the locating component 1378 may cause user interface data 1376 to be presented on the display 836 that includes a map of the facility 802 and/or directions to an item 806 for the user of the cart 1300. Additionally, or alternatively, the locating component 1378 may utilize the location of the cart, the physical-layout data 1374, and/or item data 1358 and "push" user interfaces to the display 836 that indicate various location-based information, such as indications of deals for items 806 located nearby, indications of items 806 located nearby and on the user's shopping list, and/or other user interface data 1376.

In some examples, the cart management system 1330 may further include a power-saving component 1380 configured to selectively power off or down one or more components of the cart 1300 when the cart 1300 determines that no users are within a threshold distance of the cart 1300. For example, the power-saving component 1380 may be configured to determine when a user is not within a threshold distance and, in response, may instruct one or more components of the cart 1300 to power off or otherwise lessen the power the components consume from the batter(ies) 1316. For example, the power-saving component may instruct the item-identification component 1338 and/or the event-determination component 1340 to stop performing image-processing on the image data 1356 generated by the imaging devices 834 or may instruct these components to perform the image-processing at a lesser frame rate. Additionally, or alternatively, the power-saving component may instruct the user-activation component 1332 or the activity-detection component 1334 to refrain from performing image-processing on the image data 1356 or lessen the frame rate at which these components perform the image-processing. In addition, or in the alternative, the power-saving component 1380 may instruct any of the other components of the cart management system 1330 to power off or down in order to consume less power in response to determining that a user is not within the threshold distance of the cart 1300 (e.g., within the virtual perimeter 308 of FIG. 3D), and/or may instruct any other software and/or firmware components of the cart 1300 to power off or down in response.

In addition, or in the alternative, the power-saving component 1380 may instruct one or more hardware components of the cart 1300 to power off or down in response to determining that a user is not within the threshold distance of the cart 1300. For instance, the power-saving component 1380 may instruct the imaging devices 834 to power off or lessen a frame rate at which the imaging components 834 generate the image data. Additionally, or alternatively, the power-saving component 1380 may instruct the display 836 to power off (or dim its brightness) and/or may instruct the light sources 902, lighting elements 840, weight sensors 906 (and/or weight-sensing firmware/software), the communication interfaces 1306, I/O interfaces 1304, the microphones 1320, the loudspeakers 1322, and/or any other hardware component of the cart 1300 to power off or otherwise consume less power from the batter(ies) 1316. Furthermore, in addition to power off or down any of these software, firmware, and/or hardware components of the cart 1300, the power-saving component 1380 may be configured to power on or up each of these components in response to determining that a user is within the threshold distance of the cart 1300 (e.g., within the example virtual perimeter 308).

The power-saving component 1380 may determining whether a user is within the threshold distance of the cart 1300 based on proximity data 1382 generated by the proximity sensors 1310. For instance, the power-saving component 1380 may receive the proximity data 1382 and analyze the proximity data to determine whether a user is within the threshold distance. In some instances, the proximity data 1382 indicates, for each sensor or quadrant (or the like) of a sensor, the distance to a closest user or other object. Thus, the power-saving component 1380 may determine whether the closest user/object is within the threshold distance and, if not, may send the instruction(s) for causing the component(s) to lessen their consumed power. Further, in some instances, the power-saving component 1380 may input the proximity data 1380 and/or additional sensor data generated at the same/similar time as the subject proximity data (e.g., image data 1356, accelerometer data, etc.) into one or more trained models 1384 for determining whether or not the object within the threshold distance of the cart corresponds to a user. If the trained model indicates that the object (or each object) detected by the proximity sensors 1310 does not correspond to a user, but rather an inanimate object (e.g., a rack in the facility), then the power-saving component 1380 may send the instruction(s) to lessen power consumed by the component(s) even if one or more (non-user) objects are detected within the threshold distance of the cart. It is to be appreciated that the trained model(s) may be trained as described above, by inputting training data in the form of labelled results (user, no user) and corresponding sensor data into the model during the training process. Of course, while one example is provided, the model(s) 1384 may be trained in any other manner.

In addition, while the above example describes the proximity sensors 1310 outputting proximity data 1382 indicating the distance to a nearest object, in some instances the proximity sensors may output an indication when an object is within a threshold distance but not otherwise. For instance, a first proximity sensor may be configured to output an indication in response to detecting an object within one foot, while another proximity sensor (or quadrant of the same proximity sensor) may be configured to output an indication in response to detecting an object within two feet. Thus, these proximity sensors may output the respective indications in response to detecting an object within their respective threshold distances, but otherwise may refrain from outputting data to the power-saving component 1380. Thus, the power-saving component 1380 may cause the component(s) to power off and/or down based on not receiving an indication of an object within a threshold distance from the proximity sensors 1310 for a threshold amount of time. In addition, the power-saving component 1380 may cause the component(s) to power off and/or down in response to receiving an indication that each object detected by a proximity sensor 1310 within a threshold distance within a certain amount of time does not correspond to a user, as determined by the trained model(s) 1384.

Figure 14:
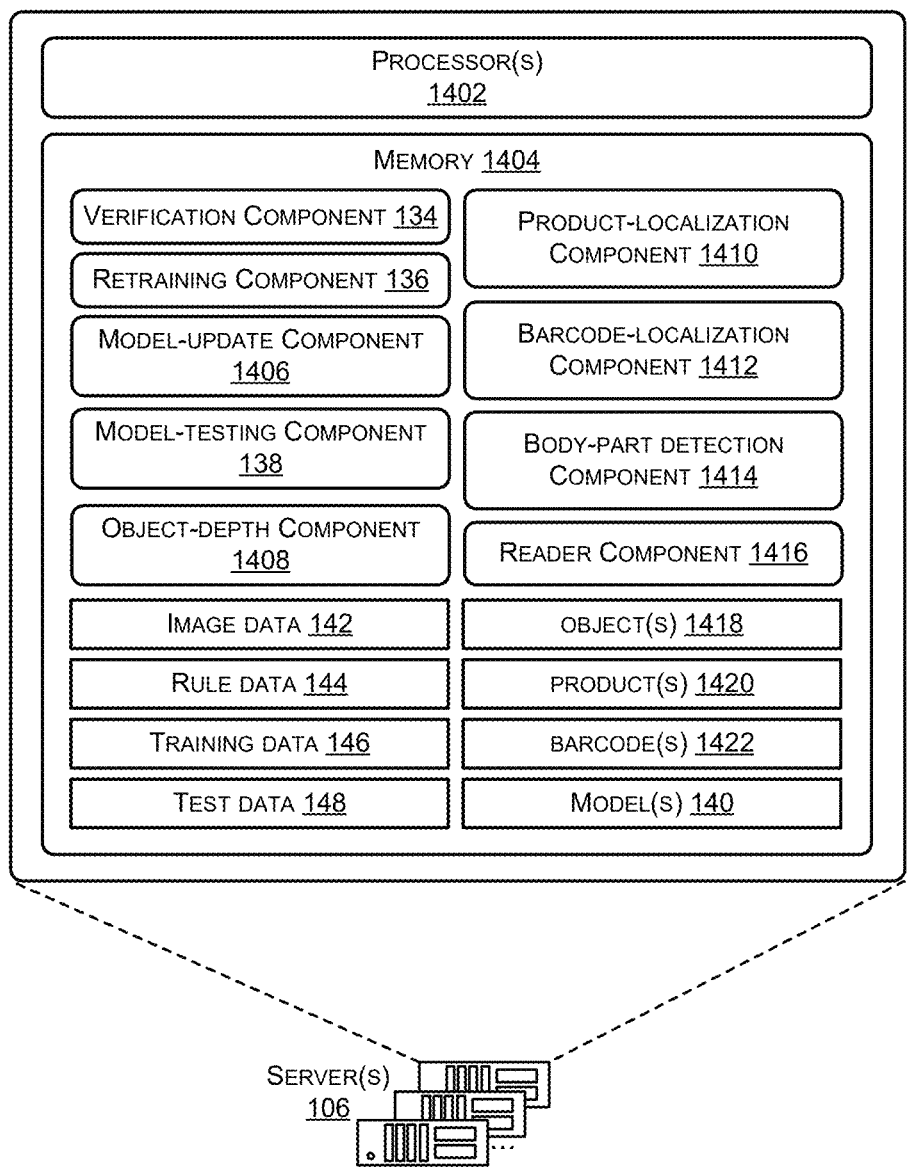
FIG. 14 illustrates example components of server computing devices for generate models for use by mobile carts to detect activity represented by image data generated by cameras of the respective mobile carts.

FIG. 14 illustrates example components of server computing devices 106 for generate models for use by mobile carts to detect activity represented by image data generated by cameras of the respective mobile carts. As illustrated, the server computing devices 106 may include one or more hardware processors 1402 and memory 1404, which may store the verification component 134, the retraining component 136, the model-testing component 138, and a model-update component 1406. As discussed above, the verification component 134 may function to re-analyze each received hard negative 130 and hard positive 132 to determine whether the activity-detection component 118 correctly labeled each of these frames. For instance, the verification component 134 may re-analyze the image data 142 associated with each of these frames to determine whether they include activity or not.

To aid in this analysis, the servers 106 may further store an object-depth component 1408, a product-localization component 1410, a barcode-localization component 1412, a body-part detection component 1414, and a reader component 1416. The object-depth component 1408 may analyzing the image data 142 to determine whether the image data (e.g., a particular frame of image data corresponding to a potential hard negative or positive) includes an object 1418 and, if so, the 3D depth of the object. The component 1408 may then determine whether this object 1418 is within a 3D volume of a region-of-interest 202(1) or 202(2). The product-localization component 1410, meanwhile, may analyze frame(s) of image data to determine whether the frame(s) include a product 1420 offered in an inventory of a facility, while the body-part detection component 1414 may analyze frame(s) of image data to determine whether the frame(s) include a body part and the barcode-localization component 1412 and the reader component 1416 may analyze frame(s) of image data to determine whether the frame(s) include a barcode 1422 and, if so, the value of the barcode 1422. As will be appreciated, the object-depth component 1408, the product-localization component 1410, the barcode-localization component 1412, the body-part detection component 1414, and the reader component 1416 may each use one or more trained machine-learning models 140 to make their respective determinations.

Further, and as discussed above, the verification component 134 may analyze the rules data 144 to determine whether or not to label a particular image frame as including activity based on information such as whether the particular image frame includes an object 1418, a product 1420, a barcode 1422, and/or a body part of a user. The rules data 144 may store any number of rules regarding whether a frame is to be labeled as including activity based on the resulting analysis of the image frame. For instance, the rules data 144 may include a rule indicating that a frame that includes an object in the region of interest is to be labeled as representing activity, that an image frame that includes a body part is to be labeled as representing activity, that an image frame that includes a barcode or item is to be labeled as representing activity, and/or so forth.

Upon the verification component 134 determining that the activity-detection component 118 of the mobile cart has correctly labeled a particular hard positive or hard negative, the verification component 134 may discard or filter out this image frame. That is, the servers 106 may determine that the cart 104 accurately identified what was presumed as a discrepancy and, thus, that data point might not be used to re-train the model in some instances. In instances where the verification component 134 determines that the activity-detection component 118 of the mobile cart has incorrectly labeled a particular hard positive or hard negative, the verification component 134 may re-label this frame and store this re-labeled frame as training data 146 for use in re-training the model(s) 140. The re-training component 136 may then use the training data 146 to re-train the model(s) 140, which now include the correctly labeled hard negatives 130 and hard positives 132. The re-training component 136 may generate a new model based on the re-training of an existing model using the now-supplemented training data 146.

After a new model 140 has been generated, the model-testing component 138 may determine whether the new model is more accurate than the model(s) currently being used by the cart 104 and/or other carts. To do so, the model-testing component 138 may apply the newly generated model 140 to test data 148 that is associated with known and accurate labels to determine an accuracy or efficacy of the model. Upon determining this accuracy or efficacy, the model-testing component 138 may determine whether this accuracy or efficacy is greater than an accuracy or efficacy of the model 120 currently being used by the cart 104 and/or other mobile carts. If so, then the model-update component 1406 may, upon some trigger event, send the newly generated model to the cart 104 and/or other carts for use by the activity-detection component 118. For instance, the model-update component 1406 may send the new model 140 to carts on a periodic basis (e.g., nightly), in response to receiving a request from an operator of the system, or the like. Using the new model 140, the activity-detection component 118 may thus be more accurate in labeling frames as including activity or not and, thus, the activity-smoothing component 122 may be more accurate in identifying activity windows and no-activity windows.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising: receiving, at a computing device, a first frame of image data generated by one or more cameras of a mobile cart;
   receiving, at the computing device, first data indicating that the first frame was determined, by a first machine-learning model operating on the mobile cart, to not represent a predefined activity indicating a user interaction in a region of interest;
   receiving, at the computing device, second data indicating that the first frame is associated with a time window that was determined to represent the predefined activity, the time window associated with at least a second frame of image data that was determined by the first machine-learning model to represent the predefined activity;
analyzing the first frame;
determining, based at least in part on the analyzing, that the first frame represents the predefined activity;
determining a first efficacy rate of the first machine-learning model, the first efficacy rate based at least in part on applying the first machine-learning model to labeled test data;
generating a second machine-learning model based at least in part on the first frame and a label indicating that the first frame represents the predefined activity;
applying the second machine-learning model to the labeled test data to determine a second efficacy rate associated with the second machine-learning model;
determining that the second efficacy rate is greater than the first efficacy rate;
and sending, to the mobile cart, the second machine-learning model in response to determining that the second efficacy rate is greater than the first efficacy rate.

2. The method as recited in claim 1, wherein:
the analyzing comprises analyzing the first frame to determine that the first frame represents an object within a three-dimensional (3D) volume associated with a basket of the mobile cart; and
the determining comprises determining that the first frame represents the predefined activity based at least in part on the analyzing the first frame to determine that the first frame represents the object within the 3D volume associated with the basket.

3. The method as recited in claim 1, wherein:
the analyzing comprises analyzing the first frame to determine that the first frame represents a body part of a user; and
the determining comprises determining that the first frame represents the predefined activity based at least in part on the analyzing the first frame to determine that the first frame represents the body part of the user.

4. The method as recited in claim 1, wherein:
the analyzing comprises analyzing the first frame to determine that the first frame represents at least one of a product, a barcode, or text; and
the determining comprises determining that the first frame represents the predefined activity based at least in part on the analyzing the first frame to determine that the first frame represents the at least one of the product, the barcode, or the text.

5. The method as recited in claim 1, wherein the time window comprises a first time window, and further comprising:
sending the second machine-learning model to the mobile cart;
receiving, at the computing device, a third frame of image data generated by the one or more cameras of a mobile cart;
receiving, at the computing device, third data indicating that the third frame was determined, by the second machine-learning model operating on the mobile cart, to represent a predefined activity;
receiving, at the computing device, fourth data indicating that the third frame is associated with a second time window that was determined to not represent the predefined activity, the second time window associated with at least a fourth frame of image data that was determined by the second machine-learning model to not represent the predefined activity;
analyzing the third frame;
determining, based at least in part on the analyzing of the third frame, that the third frame does not represent the predefined activity; and
generating a third machine-learning model based at least in part on the third frame and a label indicating that the first frame does not represent the predefined activity.

6. The method as recited in claim 1, further comprising: determining a triggering event; and sending the second machine-learning model to the mobile cart in response to determining the triggering event.

7. A computing device: one or more processors; and one or more memory storing computer-readable instructions that, upon execution by the one or more processors, configure the computing device to: receiving, at a computing device, a first frame of image data generated by one or more cameras of a mobile cart;
receiving, at the computing device, first data indicating that the first frame was determined, by a first machine-learning model operating on the mobile cart, to not represent a predefined activity indicating a user interaction in a region of interest;
receiving, at the computing device, second data indicating that the first frame is associated with a time window that was determined to represent the predefined activity, the time window associated with at least a second frame of image data that was determined by the first machine-learning model to represent the predefined activity;
analyzing the first frame;
determining, based at least in part on the analyzing, that the first frame represents the predefined activity;
determining a first efficacy rate of the first machine-learning model, the first efficacy rate based at least in part on applying the first machine-learning model to labeled test data;
generating a second machine-learning model based at least in part on the first frame and a label indicating that the first frame represents the predefined activity;
applying the second machine-learning model to the labeled test data to determine a second efficacy rate associated with the second machine-learning model;
determining that the second efficacy rate is greater than the first efficacy rate;
and sending, to the mobile cart, the second machine-learning model in response to determining that the second efficacy rate is greater than the first efficacy rate.

8. The computing device of claim 7, wherein:
the analyzing comprises analyzing the first frame to determine that the first frame represents an object within a three-dimensional (3D) volume associated with a basket of the mobile cart; and
the determining comprises determining that the first frame represents the predefined activity based at least in part on the analyzing the first frame to determine that the first frame represents the object within the 3D volume associated with the basket.

9. The computing device of claim 7, wherein:
the analyzing comprises analyzing the first frame to determine that the first frame represents a body part of a user; and
the determining comprises determining that the first frame represents the predefined activity based at least in part on the analyzing the first frame to determine that the first frame represents the body part of the user.

10. The computing device of claim 7, wherein:
  the analyzing comprises analyzing the first frame to determine that the first frame represents at least one of a product, a barcode, or text; and
  the determining comprises determining that the first frame represents the predefined activity based at least in part on the analyzing the first frame to determine that the first frame represents the at least one of the product, the barcode, or the text.

11. The computing device of claim 7, wherein the time window comprises a first time window, and wherein the computing device is further configured to:
  send the second machine-learning model to the mobile cart;
  receive, at the computing device, a third frame of image data generated by the one or more cameras of a mobile cart;
  receive, at the computing device, third data indicating that the third frame was determined, by the second machine-learning model operating on the mobile cart, to represent a predefined activity;
  receive, at the computing device, fourth data indicating that the third frame is associated with a second time window that was determined to not represent the predefined activity, the second time window associated with at least a fourth frame of image data that was determined by the second machine-learning model to not represent the predefined activity;
  analyze the third frame;
  determine, based at least in part on the analyzing of the third frame, that the third frame does not represent the predefined activity; and
  generate a third machine-learning model based at least in part on the third frame and a label indicating that the first frame does not represent the predefined activity.

12. The computing device of claim 7, to the computing device is further configured to: determine a triggering event; and send the second machine-learning model to the mobile cart in response to determining the triggering event.

13. One or more non-transitory computer-readable storage media storing instructions that, upon execution on a computing device, cause the computing device to perform operations comprising:
  receiving, at a computing device, a first frame of image data generated by one or more cameras of a mobile cart;
  receiving, at the computing device, first data indicating that the first frame was determined, by a first machine-learning model operating on the mobile cart, to not represent a predefined activity indicating a user interaction in a region of interest;
  receiving, at the computing device, second data indicating that the first frame is associated with a time window that was determined to represent the predefined activity, the time window associated with at least a second frame of image data that was determined by the first machine-learning model to represent the predefined activity;
  analyzing the first frame;
  determining, based at least in part on the analyzing, that the first frame represents the predefined activity;
  determining a first efficacy rate of the first machine-learning model, the first efficacy rate based at least in part on applying the first machine-learning model to labeled test data;
  generating a second machine-learning model based at least in part on the first frame and a label indicating that the first frame represents the predefined activity;
  applying the second machine-learning model to the labeled test data to determine a second efficacy rate associated with the second machine-learning model;
  determining that the second efficacy rate is greater than the first efficacy rate;
  and sending, to the mobile cart, the second machine-learning model in response to determining that the second efficacy rate is greater than the first efficacy rate.

14. The one or more computer-readable storage media of claim 13, wherein:
  the analyzing comprises analyzing the first frame to determine that the first frame represents an object within a three-dimensional (3D) volume associated with a basket of the mobile cart; and
  the determining comprises determining that the first frame represents the predefined activity based at least in part on the analyzing the first frame to determine that the first frame represents the object within the 3D volume associated with the basket.

15. The one or more computer-readable storage media of claim 13, where:
  the analyzing comprises analyzing the first frame to determine that the first frame represents a body part of a user; and
  the determining comprises determining that the first frame represents the predefined activity based at least in part on the analyzing the first frame to determine that the first frame represents the body part of the user.

16. The one or more computer-readable storage media of claim 13, wherein:
  the analyzing comprises analyzing the first frame to determine that the first frame represents at least one of a product, a barcode, or text; and
  the determining comprises determining that the first frame represents the predefined activity based at least in part on the analyzing the first frame to determine that the first frame represents the at least one of the product, the barcode, or the text.

17. The one or more computer-readable storage media of claim 13, wherein the time window comprises a first time window, and wherein the operations further comprise:
  sending the second machine-learning model to the mobile cart;
  receiving, at the computing device, a third frame of image data generated by the one or more cameras of a mobile cart;
  receiving, at the computing device, third data indicating that the third frame was determined, by the second machine-learning model operating on the mobile cart, to represent a predefined activity;
  receiving, at the computing device, fourth data indicating that the third frame is associated with a second time window that was determined to not represent the predefined activity, the second time window associated with at least a fourth frame of image data that was determined by the second machine-learning model to not represent the predefined activity;
  analyzing the third frame;
  determining, based at least in part on the analyzing of the third frame, that the third frame does not represent the predefined activity; and
  generating a third machine-learning model based at least in part on the third frame and a label indicating that the first frame does not represent the predefined activity.

18. The one or more computer-readable storage media of claim 13, wherein the operations further comprise: determining a triggering event; and sending the second machine-learning model to the mobile cart in response to determining the triggering event.

* * * * *